US007353280B2

(12) United States Patent
Chiles et al.

(10) Patent No.: US 7,353,280 B2
(45) Date of Patent: *Apr. 1, 2008

(54) HOME-NETWORKING

(75) Inventors: David Clyde Chiles, Mitchellville, MD (US); Eric Bosco, McLean, VA (US)

(73) Assignee: AOL LLC, a Delaware Limited Liability Company, Dulles, VA (US)

( * ) Notice: Subject to any disclaimer, the term of this patent is extended or adjusted under 35 U.S.C. 154(b) by 704 days.

This patent is subject to a terminal disclaimer.

(21) Appl. No.: 09/810,511

(22) Filed: Mar. 19, 2001

(65) Prior Publication Data

US 2001/0034759 A1    Oct. 25, 2001

Related U.S. Application Data

(60) Provisional application No. 60/189,977, filed on Mar. 17, 2000.

(51) Int. Cl.
*G06F 15/16* (2006.01)
*G06F 15/177* (2006.01)

(52) U.S. Cl. ............... 709/228; 709/220; 709/227; 709/249

(58) Field of Classification Search ........... 709/217, 709/249, 223, 225, 230; 370/466
See application file for complete search history.

(56) References Cited

U.S. PATENT DOCUMENTS

| | | |
|---|---|---|
| 3,375,208 A | 3/1968 | Duddy |
| 4,425,410 A | 1/1984 | Farrell et al. |
| 4,965,798 A | 10/1990 | Mostafa et al. |
| 5,518,761 A | 5/1996 | Hatsuda et al. |
| 5,526,357 A | 6/1996 | Jandrell |
| 5,563,882 A | 10/1996 | Bruno et al. |

(Continued)

FOREIGN PATENT DOCUMENTS

CA    2312460    2/2001

(Continued)

OTHER PUBLICATIONS

Srisuresh et al., RFC 2663—IP Network Address Translator (NAT) Terminology and Considerations, Aug. 1999, Lucent Technologies.*

(Continued)

*Primary Examiner*—David Wiley
*Assistant Examiner*—J. Bret Dennison
(74) *Attorney, Agent, or Firm*—Fish & Richardson P.C.

(57) ABSTRACT

Home-networked client devices are connected to a host system that assigns independent Internet addresses to the client devices using a home gateway device that is connected to the home-networked client devices through a network. The home gateway device, which may be physically located in a personal residence, generally includes a communication device to communicate with the host system over a single communication tunnel established between the home gateway device and the host system. The home gateway device also includes a network address translation module. The client devices are typically connected to the home gateway device through a network and the client devices communicate with the host system through the home gateway device over the single communication tunnel. This enables the host system to establish individual communication sessions with the client devices over the single communication tunnel and to assign independent Internet addresses to the client devices.

45 Claims, 16 Drawing Sheets

U.S. PATENT DOCUMENTS

| | | | |
|---|---|---|---|
| 5,577,197 A | 11/1996 | Beck | |
| 5,602,841 A | 2/1997 | Lebizay | |
| 5,606,668 A | 2/1997 | Shwed | |
| 5,706,507 A | 1/1998 | Schloss | |
| 5,732,071 A | 3/1998 | Saito et al. | |
| 5,745,884 A | 4/1998 | Carnegie et al. | |
| 5,822,523 A | 10/1998 | Samuel et al. | |
| 5,826,000 A | 10/1998 | Hamilton | |
| 5,852,722 A | 12/1998 | Hamilton | |
| 5,870,386 A | 2/1999 | Perlman et al. | |
| 5,877,724 A | 3/1999 | Davis | |
| 5,907,831 A | 5/1999 | Lotvin et al. | |
| 5,918,019 A | 6/1999 | Valencia | |
| 5,973,684 A | 10/1999 | Brooks et al. | |
| 5,987,611 A | 11/1999 | Freund | |
| 6,006,272 A | 12/1999 | Aravamudan et al. | |
| 6,052,750 A | 4/2000 | Lea | |
| 6,055,236 A | 4/2000 | Nessett et al. | |
| 6,085,236 A | 7/2000 | Lea | |
| 6,101,543 A * | 8/2000 | Alden et al. | 709/229 |
| 6,119,165 A | 9/2000 | Li et al. | |
| 6,167,120 A * | 12/2000 | Kikinis | 379/90.01 |
| 6,198,479 B1 | 3/2001 | Humpleman et al. | |
| 6,212,192 B1 | 4/2001 | Mirashrafi et al. | |
| 6,219,706 B1 | 4/2001 | Fan et al. | |
| 6,314,447 B1 | 11/2001 | Lea et al. | |
| 6,314,459 B1 | 11/2001 | Freeman | |
| 6,337,899 B1 | 1/2002 | Alcendor et al. | |
| 6,349,352 B1 | 2/2002 | Lea | |
| 6,381,222 B1 * | 4/2002 | Kikinis | 370/280 |
| 6,421,325 B1 * | 7/2002 | Kikinis | 370/280 |
| 6,434,596 B1 | 8/2002 | Ludtke et al. | |
| 6,446,128 B1 | 9/2002 | Woods et al. | |
| 6,493,875 B1 | 12/2002 | Eames et al. | |
| 6,496,867 B1 * | 12/2002 | Beser et al. | 709/245 |
| 6,523,068 B1 * | 2/2003 | Beser et al. | 709/238 |
| 6,526,581 B1 | 2/2003 | Edson | |
| 6,535,517 B1 | 3/2003 | Arkko et al. | |
| 6,546,419 B1 | 4/2003 | Humpleman et al. | |
| 6,557,037 B1 | 4/2003 | Provino | |
| 6,564,327 B1 | 5/2003 | Klensin et al. | |
| 6,603,762 B1 * | 8/2003 | Kikinis | 370/352 |
| 6,606,659 B1 | 8/2003 | Hegli et al. | |
| 6,615,357 B1 * | 9/2003 | Boden et al. | 726/15 |
| 6,631,416 B2 * | 10/2003 | Bendinelli et al. | 709/227 |
| 6,640,251 B1 * | 10/2003 | Wiget et al. | 709/238 |
| 6,643,684 B1 | 11/2003 | Malkin et al. | |
| 6,654,373 B1 | 11/2003 | Maher, III et al. | |
| 6,654,792 B1 * | 11/2003 | Verma et al. | 709/208 |
| 6,658,415 B1 | 12/2003 | Brown et al. | |
| 6,671,739 B1 * | 12/2003 | Reed | 709/246 |
| 6,693,878 B1 * | 2/2004 | Daruwalla et al. | 370/235 |
| 6,694,349 B1 | 2/2004 | Zou | |
| 6,697,864 B1 * | 2/2004 | Demirtjis et al. | 709/229 |
| 6,704,031 B1 | 3/2004 | Kimball et al. | |
| 6,708,219 B1 * | 3/2004 | Borella et al. | 709/245 |
| 6,738,382 B1 * | 5/2004 | West et al. | 370/401 |
| 6,745,367 B1 | 6/2004 | Bates et al. | |
| 6,754,321 B1 | 6/2004 | Innes et al. | |
| 6,757,836 B1 | 6/2004 | Kumer et al. | |
| 6,802,068 B1 * | 10/2004 | Guruprasad | 719/319 |
| 6,832,322 B1 * | 12/2004 | Boden et al. | 726/15 |
| 6,954,861 B2 | 10/2005 | Watkins et al. | |
| 7,027,652 B1 | 4/2006 | I'Anson | |
| 7,051,116 B1 | 5/2006 | Rodriguez-Val et al. | |
| 7,079,499 B1 * | 7/2006 | Akhtar et al. | 370/310 |
| 7,124,938 B1 | 10/2006 | Marsh | |
| 2001/0000707 A1 * | 5/2001 | Kikinis | 379/93.01 |
| 2001/0036192 A1 | 11/2001 | Chiles et al. | |
| 2002/0049806 A1 | 4/2002 | Gatz et al. | |
| 2002/0071423 A1 | 6/2002 | Mirashrafi et al. | |
| 2002/0116471 A1 | 8/2002 | Shteyn | |
| 2002/0165860 A1 | 11/2002 | Glover et al. | |
| 2002/0169764 A1 | 11/2002 | Kincaid et al. | |
| 2002/0191572 A1 | 12/2002 | Weinstein et al. | |
| 2003/0005455 A1 | 1/2003 | Bowers | |
| 2003/0009495 A1 | 1/2003 | Ajaoute | |
| 2003/0115345 A1 * | 6/2003 | Chien et al. | 709/229 |
| 2003/0123465 A1 | 7/2003 | Donahue | |
| 2004/0006621 A1 | 1/2004 | Bellinson et al. | |
| 2004/0019588 A1 | 1/2004 | Dogmata et al. | |
| 2005/0175020 A1 * | 8/2005 | Park et al. | 370/400 |

FOREIGN PATENT DOCUMENTS

| | | |
|---|---|---|
| EP | 0889668 A2 | 1/1999 |
| JP | 11-275083 | 10/1999 |
| JP | 2001-237898 | 8/2001 |
| WO | WO99-19988 A | 4/1999 |
| WO | WO99/52244 | 10/1999 |
| WO | WO 00/72532 | 11/2000 |
| WO | WO 01/22661 A2 | 3/2001 |
| WO | WO 01/60897 | 8/2001 |
| WO | WO 01/61897 | 8/2004 |

OTHER PUBLICATIONS

Network Telesystems, NTS Tunnel Builder User's Guide; Mar. 1999.*

R. Droms; Networking Group; Request For Comments: 1541; Oct. 1993.*

Newswire Association Inc, Ramp Networks Announces Comprehensive Virtual Private Network Solution; Targets Corporate Branch Offices; Aug. 9, 1999.*

Red Creek; "Ravlin 7100, High Performance Virtual Private Network Device for the Enterprise Gateway and ISP"; "http://web.archive.org/web/20000303093640/www.redcreek.com/products/7100.html".*

Brill, Pamela, Fast & Furious, Mar. 22, 1999, Network Computing, pp. 1-3.*

Business Wire, Feb. 10, 1998, Ramp Network Ships IP Tunneling Kit for WebRamp M3 Family, pp. 1-4.*

Fowler, Dennis, VPN's Become a Virtual Reality, Apr./May 1998, pp. 1-4.*

Patel et al., "DHCP Configuration of IPSEC Tunnel Mode", IPSEC Working Group, Dec. 1999, 10 pages.*

SonicWall Inc., "Configuring DHCP over VPN" Nov. 12, 2002, 11 pages.*

Evans, Shara: "Tunnelling through the web" Standards Watch, 'Online'; Mar. 1999; http://www.telsyte.com.au/standardswatch/tunnels.htm, pp. 1-6.

W. Townsley et al.: Layer 2 Tunneling Protocol "L2TP" IETF, 'Online'; http://www.ietf.org/rfc/rfc2661.txt; Aug. 1999, pp. 1-80.

Redback Networks: "PPP over Ethernet" 'Online'; Mar. 1999; http://www.redback.com/en-US/whitepp/pdf/wp_pppoe_comparison.pdf, pp. 1-8.

M. Borella et al., "Realm Specific IP: Framework," pp. 1-30 (Jul. 2000), available at ftp://ftp.isi.edu/internet-drafts/draft-ietf-nat-rsip-framework-05.txt.

G. Montenegro et al., "RSIP Support for End-to-end IPsec," pp. 1-18 (Jul. 2000), available at http://www.ietf.org/internet-drafts/draft-ietf-nat-rsip-ipsec-04.txt.

L. Mamakos et al., "A Method for Transmitting PPP Over Ethernet (PPPoE)," pp. 1-15 (Feb. 1999), available at ftp://ftp.isi.edu/in-notes/rfc2516.txt.

"Embedded Web Guru Co-Authors New Security Standard; Digest Authentication Provides Secure Web Login," Business Wire, Jun. 14, 1999, pp. 1-2.

"Intel Introduces High Speed Wireless Networking Products Designed for the Home and Small Office," M2 Communications Ltd., 2001, pp. 1-3.

"Network Address Translation Technical Discussion," http://safety.net/nattech.html, Apr. 18, 1996, pp. 1-4.

"PPP over Ethernet: A Comparison of Alternatives for PC-to-xDSL Modem Connectivity," Redback Networks, Mar., 1999, pp. 1-8.

"Ramp Networks Announces Comprehensive Virtual Private Network Solution; Targets Corporate Branch Offices," PRNewswire, Aug. 9, 1999, 2 pages.

Agranat, Ian, "Authentication Standardizes Web," *Electronic Engineering Times*, No. 1018, p. 78, Jul. 27, 1998.

Baeza-Yates, R. et al., "Modern Information Retrieval, Chapter 13, Searching the web," Modern Information Retrieval, Harlow: Addison-Wesley, GB, 1999, pp. 367-395.

Craswell, N., Hawking, D. and Thistlewaite, P., "Merging Results from Isolated Search Engines," Proceedings of the 10th Australasian Database Conference, Aukland, New Zealand, Jan. 18-21, 1999, 12 pages.

Desai, M. and Spink, A., "An Approach to Document Clustering Based on System Relevance," Proceedings of the 67th American Society for Information Science and Technology (ASIS&T), vol. 41, No. 1, Nov. 12, 2004, pp. 256-266.

Etzioni, O., "Moving Up the Information Food Chain, Deploying Softbots on the World Wide Web," Proceedings on the Thirteenth National Conference on Artificial Intelligence, Aug. 4, 1996, pp. 1322-1326.

Evans, Shara: "Tunnelling through the web" Standards Watch, 'Online'; Mar. 1999; http://www.telsyte.com.au/standardswatch/tunnels.htm, pp. 1-6.

Fei-Yue Wang et al., "An Application Specific Knowledge Engine For Researchers In Intelligent Transportation Systems," 2004 IEEE Intelligent Transportation Systems Conference, Washington, DC, Oct. 3-6, 2004, pp. 841-846.

G. Montenegro et al., "RSIP Support for End-to-end IPsec," pp. 1-18 (Jul. 2000), available at http://www.ietf.org/internet-drafts/draft-ietf-nat-rsip-ipsec-04.txt.

G. Tsirtsis et al., "Network Address Translation - Protocol Translation (NAT-PT)," http://www.ietf.org/rfc2766.txt?number=2766, Feb. 2000, pp. 1-21.

Gauch, Susan et al., "ProFusion*: Intelligent Fusion from Multiple, Distributed Search Engines," Journal of Universal Computer Science, vol. 2, No. 9, Sep., 1996, 13 pages.

Jain A. K., et al., "Data Clustering: A Review," ACM Computing Surveys, New York, NY, vol. 31, No. 3, Sep. 3, 1999, pp. 264-323.

K. Egevang et al., "The IP Network Address Translator (NAT)," http://www.cis.ohio-state.edu/cgi-bin/rfc/rfc1631.html, May 1994, pp. 1-10.

M. Holdrege et al., "Protocol Complications with the IP Network Address Translator," http://www.ietf.org/rfc/rfc3027.txt?number=3027, Jan. 2001, pp. 1-20.

Meng, W. et al. "Building Efficient and Effective Metasearch Engines," ACM Computing Surveys, vol. 34, No. 1, Mar. 2002, New York, NY, pp. 48-89.

Oztekin B.U. and Karypis, G. and Kumar, V., "Expert Agreement And Content Based Reranking In A Meta Search Environment Using Mearf," Proceeding of the 11th International Conference on World Wide Web, May 7-11, 2002, Honolulu, Hawaii, pp. 333-344.

P. Srisuresh et al., "IP Network Address Translator (NAT) Terminology and Considerations," http://www.ietf.org/rfc/rfc2663.txt?number=2663, Aug. 1999, pp. 1-30.

P. Srisuresh et al., "Traditional IP Network Address Translator (Traditional NAT)," http://www.ietf.org/rfc/rfc3022.txt?number=3022, Jan. 2001, pp. 1-16.

Prosise, Jeff, "ASP.NET Security: An Introductory Guide Building and Deploying More Secure Sites with ASP.NET and IIS," *MSDN Magazine*, vol. 17, No. 4, p. 54, Apr. 30, 2002.

Rasolofo Y. et al., "Result Merging Strategies For A Current News Metasearcher," Information Processing & Management 39 (2003), Elsevier, Barking GB, pp. 581-609.

Spoerri A., "Coordinated Views And Tight Coupling To Support Mega Searching," Proceedings of the Second International Conference on Coordinated and Multiple Views in Exploratory Visualization, 2004, pp. 39-48.

Zhang, J. and Cheung, C. "Meta-Search-Engine Feature Analysis," Online Information Review, vol. 27, No. 6, 2003, pp. 433-441.

Alexander, S. and Droms, R., "DHCP Options and BOOTP Vendor Extensions (Request for Comments: 2132)", The Internet Engineering Task Force, Mar. 1997, pp. 1-32.

Non-Final Office Action dated Jul. 29, 2004; U.S. Appl. No. 09/810,421; 34 pages.

Final Office Action dated Mar. 14, 2005; U.S. Appl. No. 09/810,421; 55 pages.

Advisory Action dated Jul. 18, 2005; U.S. Appl. No. 09/810,421; 4 pages.

Non-Final Office Action dated Nov. 21, 2005; U.S. Appl. No. 09/810,421; 122 pages.

Final Office Action dated Jul. 20, 2006; U.S. Appl. No. 09/810,421; 37 pages.

Advisory Action dated Jan. 17, 2007; U.S. Appl. No. 09/810,421; 2 pages.

Advisory Action dated Jan. 23, 2007; U.S. Appl. No. 09/810,421; 3 pages.

Notice of Allowance dated May 4, 2007; U.S. Appl. No. 09/810,421; 30 pages.

Office Action dated Apr. 17, 2006; U.S. Appl. No. 10/227,243; 11 pages.

Final Office Action dated Sep. 22, 2006; U.S. Appl. No. 10/227.243; 12 pages.

Final Office Action dated Dec. 22, 2006; U.S. Appl. No. 10/227,243; 12 pages.

Advisory Action dated Apr. 19, 2007; U.S. Appl. No. 10/227,243; 3 pages.

Office Action dated Dec. 19, 2005; U.S. Appl. No. 10/208,205; 13 pages.

Office Action dated Jun. 12, 2006; U.S. Appl. No. 10/208,205; 24 pages.

Office Action dated Dec. 4, 2006; U.S. Appl. No. 10/208,205; 13 pages.

Final Office Action dated Jul. 3, 2007; U.S. Appl. No. 10/208,205; 16 pages.

Office Action dated May 22, 2006; U.S. Appl. No. 10/208,203; 9 pages.

Office Action dated Nov. 2, 2006; U.S. Appl. No. 10/208,203; 20 pages.

Advisory Action dated Feb. 23, 2007; U.S. Appl. No. 10/208,203; 3 pages.

Office Action dated Apr. 13, 2007; U.S. Appl. No. 10/208,203; 22 pages.

Office Action dated Sep. 26, 2005; U.S. Appl. No. 10/208,181; 21 pages.

Final Office Action dated Apr. 21, 2006; U.S. Appl. No. 10/208,181; 30 pages.

Advisory Action dated Jul. 24, 2006; U.S. Appl. No. 10/208,181; 3 pages.

Office Action dated Nov. 27, 2006; U.S. Appl. No. 10/208,181; 26 pages.

Final Office Action dated May 29, 2007; U.S. Appl. No. 10/208,181; 28 pages.

Office Action dated May 8, 2006; U.S. Appl. No. 10/208,207; 14 pages.

Final Office Action dated Oct. 26, 2006; U.S. Appl. No. 10/208,207; 12 pages.

Advisory Action dated Jan. 22, 2007; U.S. Appl. No. 10/208,207; 3 pages.

Office Action dated Apr. 9, 2007; U.S. Appl. No. 10/208,207; 12 pages.

Office Action dated Nov. 20, 2006; U.S. Appl. No. 10/447,958; 11 pages.

Notice of Allowance dated May 29, 2007; U.S. Appl. No. 10/447,958; 4 pages.

* cited by examiner

HOME-NETWORKING

CROSS REFERENCE TO RELATED APPLICATIONS

This application claims priority from U.S. Provisional Application No. 60/189,977, filed Mar. 17, 2000, and titled "Home-networking," which is incorporated by reference.

TECHNICAL FIELD

This invention relates to connecting multiple home-networked client devices to a host system.

BACKGROUND

An increasing number of households have more than one personal computing device. As the number of personal computing devices within the home increases, there is a need and consumer demand for interconnectivity among these devices and for connectivity between these devices and host systems located outside of the home. For instance, in a household that includes more than one personal computing device, it may be desirable to enable connection between each device and an Internet Service Provider (ISP). It is possible to simply network several devices together in the home to enable interconnectivity among the devices and to enable a connection to outside host systems. However, with the devices networked together, the host system may recognize the entire network as a single device rather than recognizing the individual devices within the network or users of those individual devices.

Failing to recognize and thus distinguish the individual devices or individual users of the devices may prevent the host system from enforcing or enabling preferences and features otherwise distinguishable among individual devices or users, such as parental access controls. Similarly, without recognition of or distinction among devices and their users, the individual client devices and users of the client devices may not be able to access and receive back from the host certain host-maintained preferences, such as personal identification settings, personal web pages, account information, wallet information, and financial information.

SUMMARY

In one general aspect, home-networked client devices are connected to a host system that assigns independent Internet addresses to the home-networked client devices using a home gateway device that is connected to the home-networked client devices through a network. The home gateway device, which may be physically located in a personal residence, generally includes a communication device to communicate with the host system over a single communication tunnel established between the home gateway device and the host system. The home gateway device also typically includes a network address translation module. The home-networked client devices communicate with the host system through the home gateway device over the single communication tunnel. The system configuration enables the host system to establish individual communication sessions with the home-networked client devices over the single communication tunnel and to assign independent Internet addresses to the home-networked client devices.

Implementations may include one or more of the following features. For example, the home gateway device and the home-networked client devices may be physically located in a personal residence. The personal residence may include a single family dwelling. The home-networked client devices may include wireless client devices that may be connected to the home gateway device through a wireless network such that the wireless client devices may operate outside of the personal residence.

The home-networked client devices may establish simultaneous individual communication sessions with the host system over the single communication tunnel. Each home-networked client device may be assigned an independent Internet address by the host system, which may include an Internet Service Provider.

The network address translation module may include a port-based or an address-based network address translation module. The network address translation module may interface with the home-networked client devices and the host system to route communications between the host system to the home-networked client devices by translating the independent Internet addresses assigned by the host system to the home-networked client devices and local addresses belonging to the home-networked client devices that are used on the network between the home gateway device and the home-networked client devices.

The home gateway device may communicate with the home-networked client devices using a first protocol and may communicate with the host system using a second protocol. The first protocol and the second protocol may be the same protocol, or the second protocol may differ from the first protocol.

The home gateway device may include one or more modules that are structured and arranged to convert between the first protocol and the second protocol. The first protocol may include TCP/IP and the second protocol may include L2TP.

The home-networked client devices may include client devices having computer software that enables the client devices to interface with the home gateway and to communicate with the host system through the home gateway device, such that the host system is able to recognize independent client devices. The independent client devices may be recognized by the host system through the use of unique identifiers assigned to each of the client devices by the host system during the established communication session. The unique identifiers may be unique to the client devices and/or to users of the client devices. A unique identifier may include an independent Internet address and also may include a unique identifier for a user of a client device combined with an independent Internet address assigned to the client device. In addition, a unique identifier may include a screen name for a user of the client devices.

When the user has a unique identifier that is combined with the independent Internet address assigned by the host system to the client device, the user may be enabled to access individual information maintained by the host system for that particular user. Additionally, the host system may be enabled to enforce host-based parental or other controls. Individual information maintained by the host system may include wallet information, calendar information, and personalized web page information.

These general and specific aspects may be implemented using a system, a method, or a computer program, or any combination of systems, methods, and computer programs.

Other features and advantages will be apparent from the description and drawings, and from the claims.

DESCRIPTION OF DRAWINGS

Like reference symbols in the various drawings indicate like elements.

DETAILED DESCRIPTION

Figure 1:
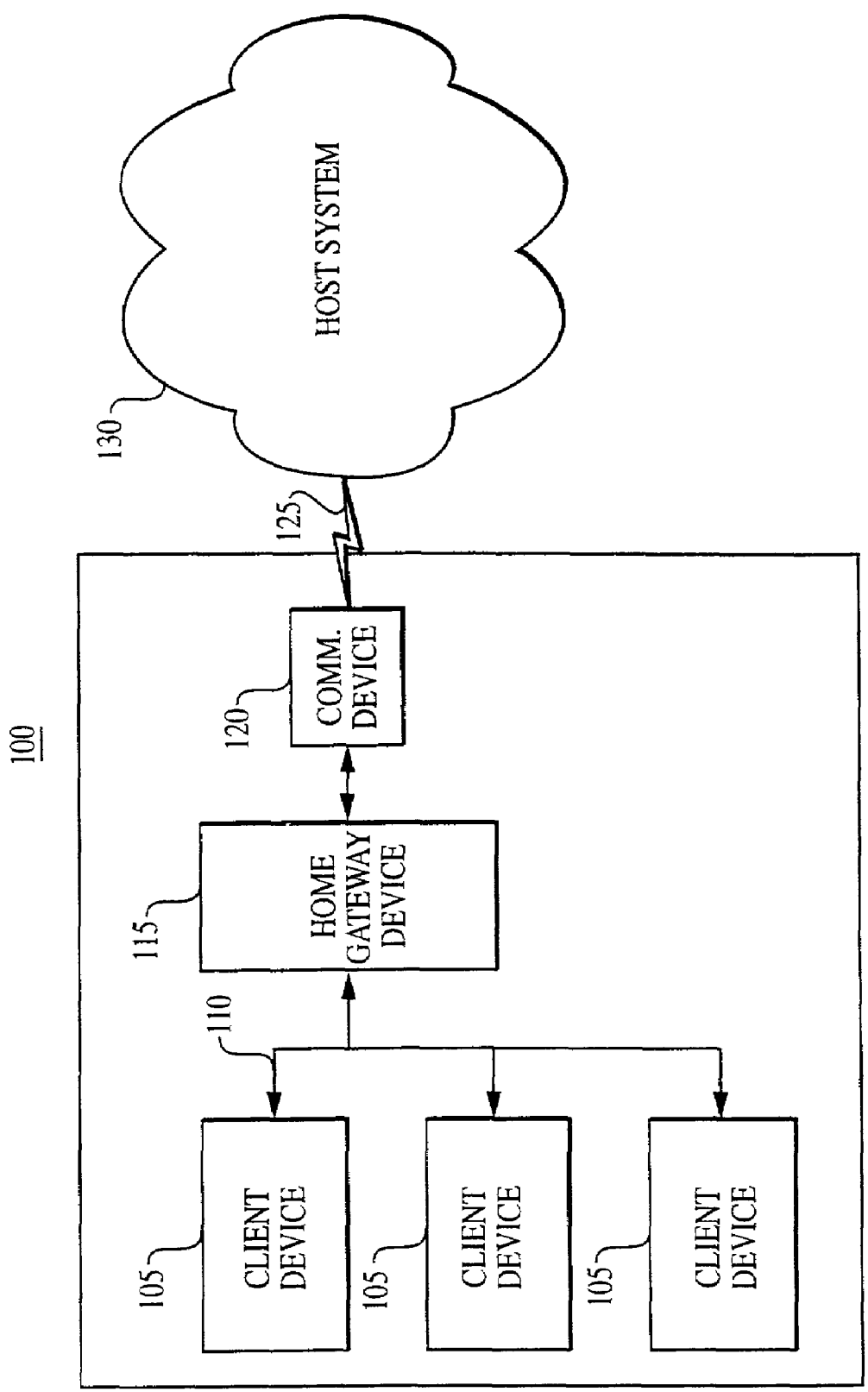
FIG. 1 is a block diagram of a home networking system.

Referring to FIG. 1, a home networking system 100 typically includes multiple home-networked client devices 105 ("client devices") connected through a network 110 to each other and to a home gateway device 115. The home gateway device 115 typically connects to the host system 130 through a communication device 120 over communication links 125. The home networking system 100 enables the client devices 105 to communicate with the host system 130 through the home gateway device 115 using the single communication device 120. The client devices 105, the home gateway device 115, and the communication device 120 may be physically located in a personal residence, as indicated by the dashed lines shown in FIG. 1.

The home networking system 100 enables the host system 130 to assign unique identifiers (e.g., independent Internet addresses) to each of the client devices 105 through the home gateway device 115 over a single communication link 125 established between the home gateway device 115 and the host system 130. The home networking system 100 also enables the client devices 105 to access information maintained by the host system 130 for a particular client device 105 or a particular individual user of the client devices 105. In addition, the home networking system 100 enables the host system 130 to maintain and enforce individual preferences associated with a particular client device 105 or a user of the client devices 105 through using the host-assigned unique identifiers and/or some combination of the host-assigned unique identifiers with other identifiers (e.g., login name, account number, screen name, and password).

The client devices 105 and the home gateway device 115 typically are located in a physical place that enables the home gateway device 115 to network with the client devices 105. In one implementation, for example, the home gateway device 115 is physically located in a personal residence (e.g., a single-family dwelling, a house, a townhouse, an apartment, or a condominium). The client devices 105 may be physically located such that communications over the network 110 with the home gateway device 115 are enabled and maintained. For instance, when the home gateway device 115 is physically located in a personal residence, the client devices 105 also may be physically located in the personal residence. However, the location of the home gateway device 115 in the personal residence does not preclude one or more of the client devices 105 from being networked to the home gateway device 115 from a remote location. Nor does it preclude use of one or more of the client devices 105 from outside of the personal residence or communication by those devices with the host system 130 through the home gateway device 115. For instance, the client devices 105 may include one or more portable computing devices that may be taken outside of the personal residence and still remain connected to the home gateway device 115 located within the personal residence through a wireless network 110.

The client devices 105 may include one or more general-purpose computers (e.g., personal computers), one or more special-purpose computers (e.g., devices specifically programmed to communicate with the home gateway device 115 and/or the host system 130), or a combination of one or more general-purpose computers and one or more special-purpose computers. Other examples of client devices 105 include a workstation, a server, an appliance (e.g., a refrigerator, a microwave, and an oven), an intelligent household device (e.g., a thermostat, a security system, an HVAC system, and a stereo system), a device, a component, other physical or virtual equipment, or some combination of these elements capable of responding to and executing instructions within the system architecture.

Figure 2:
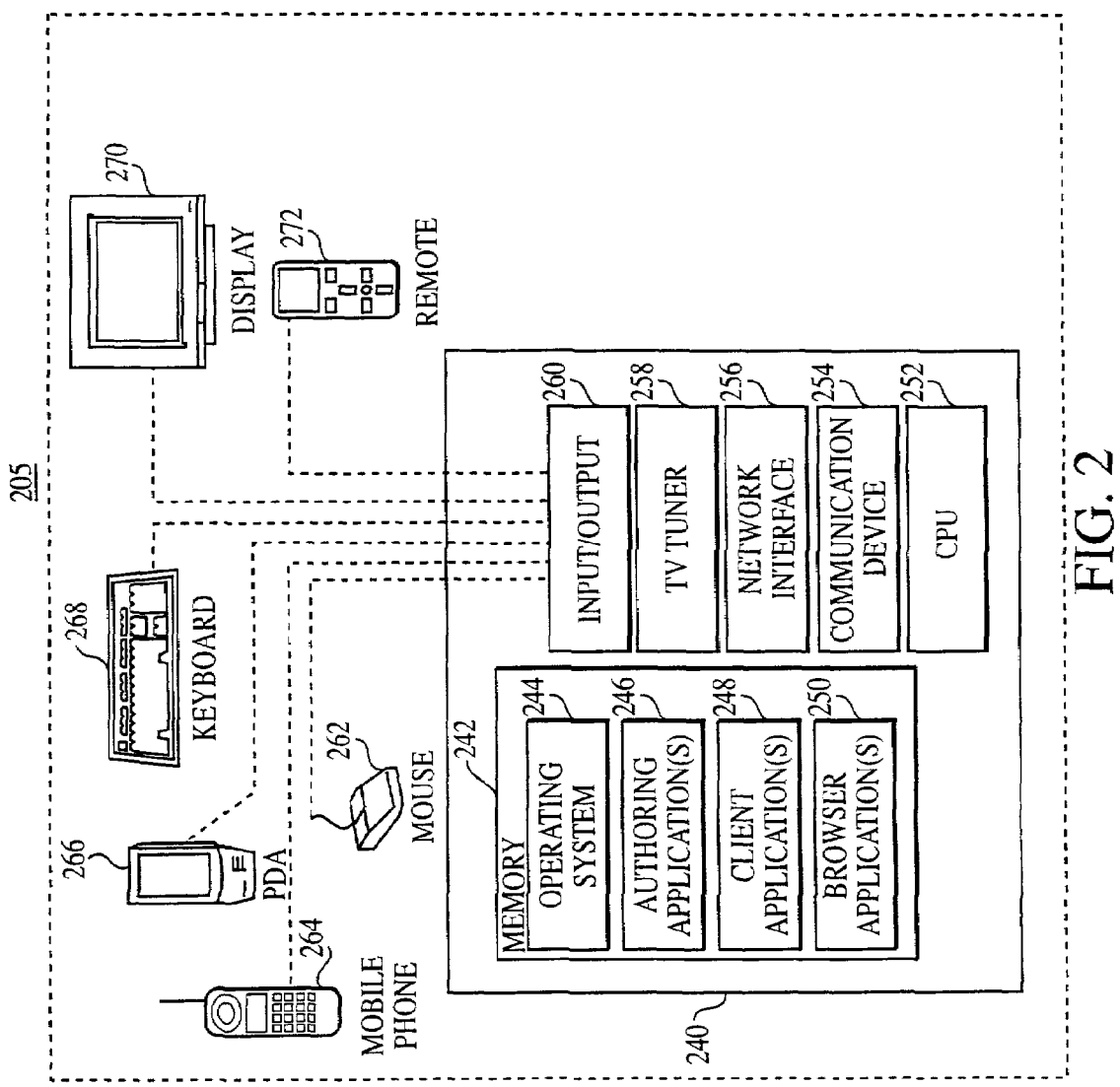
FIG. 2 is a block diagram of a client device of the system of FIG. 1.

Referring to FIG. 2, components of a client device 205 are shown to illustrate one possible implementation of the client devices 105 of FIG. 1. The client device 205 may include a general-purpose computer 240 having an internal or external storage 242 for storing data and programs such as an operating system 244 (e.g., DOS, Windows™, Windows 95™, Windows 98™, Windows 2000™, WindowsNT™, OS\2 and Linux) and one or more application programs. Examples of application programs include authoring applications 246 (e.g., wordprocessing, database programs, spreadsheet programs, and graphic programs) capable of generating documents or other electronic content; client applications 248 (e.g., AOL client, COMPUSERVE client, AIM client, AOL TV client, and ISP client) capable of communicating with other computer users, accessing various computer resources, and viewing, creating, or otherwise manipulating electronic content; and browser applications 250 (e.g., Netscape's Navigator and Microsoft's Internet Explorer) capable of rendering standard Internet content.

The general-purpose computer 240 also includes a central processing unit (CPU) 252 for executing instructions in response to commands from a client controller. In one implementation, the client controller includes one or more of the application programs installed on the internal or external storage 242 of the general-purpose computer 240. In another implementation, the client controller includes application programs externally stored in and executed by one or more devices external to the general-purpose computer 240.

The general-purpose computer 240 typically will include a communication device 254 for sending and receiving data. One example of the communication device 254 is a modem. Other examples include a transceiver, a set-top box, a communication card, an xDSL modem (e.g., ADSL, CDSL, DSL Lite, HDSL, IDSL, RADSL, SDSL, UDSL, and VDSL), a cable modem, a satellite modem, a satellite dish, and an antenna, or another network adapter capable of transmitting and receiving data over a network through a wired or wireless data pathway.

In addition to or as an alternative to the communication device 254, the general-purpose computer 240 may include a network interface card (NIC) 256, which may provide a dedicated, full-time connection to a network. Examples of NIC types include ISA, EISA, PCMCIA, PCI, Sbus, MCA, NuBus, and USB, which may support various types of networks, buses and connectivities.

The general-purpose computer 240 also may include a television (TV) tuner 258 for receiving television programming in the form of broadcast, satellite, and/or capable TV signals. As a result, the client devices 205 can selectively and/or simultaneously display network content received by the communication device 254 and television programming content received by the TV tuner 258.

The general-purpose computer typically will include an input/output interface 260 to enable a wired or wireless connection to various peripheral devices. Examples of peripheral devices include, but are not limited to, a mouse 262, a mobile phone 264, a personal digital assistant (PDA) 266, a keyboard 268, a display monitor 270 with or without a touch screen input, and/or a remote control 272 for receiving information from and rendering information to subscribers. Other examples may include voice recognition and synthesis devices (not shown).

Although devices such as a mobile telephone 264, a PDA 266, and a TV remote control 272 may be considered peripheral with respect to the general-purpose computer 240, in another implementation, such devices may themselves include the functionality of the general-purpose computer and may operate as a stand-alone client device 205. For example, the mobile phone 264 or the PDA 266 may include computing and networking capabilities, and may function as the client device 205.

Referring again to FIG. 1, the client devices 105 typically are connected to one another and to the home gateway device 115 through a network 110, such as a Local Area Network (LAN). The network 110 may include a wired and/or a wireless network. For instance, one or more of the client devices 105 may be connected to the home gateway device 115 via a wired network 110 and, at the same time, one or more other client devices 105 may be connected to the home gateway device 115 via a wireless network 110. Examples of types of networks 110 include a token ring, an Ethernet, a Fast Ethernet, a Gigabit Ethernet, HomePNA, and powerline networking.

As mentioned above, the client devices 105 access and communicate with the host system 130 through the home gateway device 115. For example, the home gateway device 115 may include a general-purpose computer (e.g., personal computer), or a special-purpose computer. Other examples of the home gateway device 115 may include a workstation, a server, a device, a component, other physical or virtual equipment, or some combination thereof capable of responding to and executing instructions in the manner defined to function as the home gateway device.

The home gateway device 115 may include internal or external storage for storing data and programs as described above with respect to the client devices 105, such as an operating system, application programs, client applications, and browser applications. In addition to these programs and applications, the home gateway device 115 may include one or more special modules and programs (e.g., a Network Address Translation module, a PPPoE Access Concentrator module, an L2TP Access Concentrator module, a dialer module, and a DHCP module) or combinations of these modules and programs designed to allow the home gateway device 115 to communicate with the client devices 105 over the network 110 and to facilitate communications between the client devices 105 with the host system 130 through the home gateway device 115. Additionally or alternatively, the home gateway device 115 may be embodied as part of a client device 105 with the functionality to perform as the home gateway device 115.

The home gateway device 115 typically includes or has access to a communication device 120. Examples of the communication device 120 may include the communication devices described above with respect to the communication device 254 in FIG. 2. Additionally or alternatively, the home gateway device 115 typically includes a network interface card such as described above with respect to the network interface card 256 in FIG. 2.

The home gateway device 115 typically communicates with the host system 130 through communication links 125. The communication links 125 typically include a delivery network making a direct or indirect communication between the home gateway device 115 and the host system 130, irrespective of physical separation. Examples of a delivery network include the Internet, the World Wide Web, WANs, LANs, analog or digital wired and wireless telephone networks (e.g., PSTN, ISDN, and xDSL), radio, television, cable, satellite, and/or any other delivery mechanism for carrying data.

Figure 3:
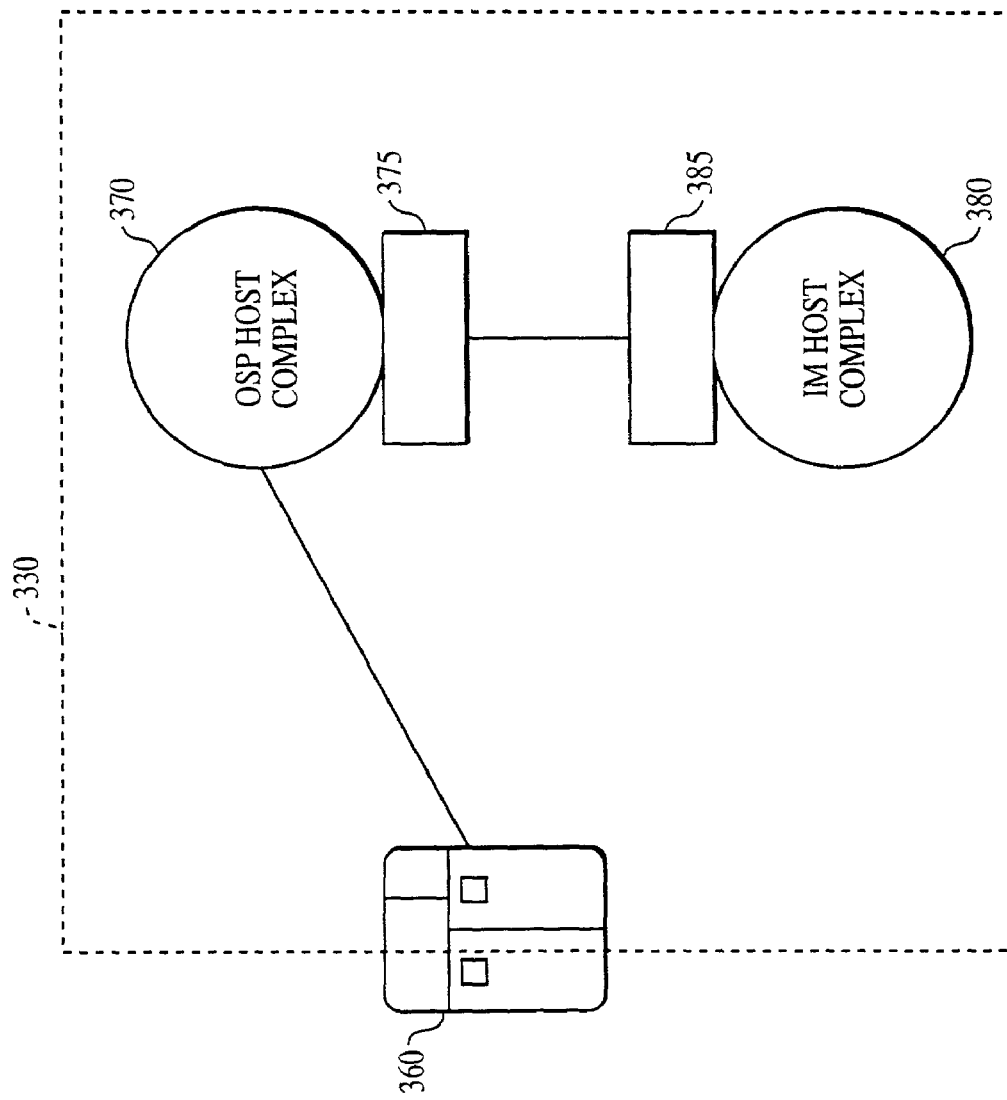
FIG. 3 is a block diagram of a host system of the system of FIG. 1.

Referring to FIG. 3, components of a host system 330 are shown to illustrate one possible implementation of the host system 130 of FIG. 1. The host system 330 typically includes one or more host devices 360. The host devices 360 may include hardware components and/or software components, such as one or more general-purpose computers (e.g., personal computers), one or more special-purpose computers (e.g., devices specifically programmed to communicate with the home gateway device 115 and/or the client devices 105), or a combination of one or more general-purpose computers and one or more special-purpose computers. Other examples of host devices 360 include a workstation, a server, a component, a device, other physical or virtual equipment, or some combination of these elements that is capable of responding to and executing instructions within the system architecture.

More specifically, a host device 360 within the host system 330 may include a login server for enabling access by subscribers and routing communications between other systems (e.g., client devices 105 and the home gateway device 115 from FIG. 1) and other elements of the host system 330. The host system 330 also may include various host complexes such as an OSP ("Online Service Provider") host complex 370 and an IM ("Instant Messaging") host complex 380. To enable access to these host complexes by subscribers, the client devices (e.g., 105 from FIG. 1) and the home gateway device (e.g., 115 from FIG. 1) may include communication software such as an OSP client application and an IM client application. The OSP and IM communication software applications are designed to facilitate the subscriber's interactions with the respective services and, in particular, may provide access to some or all of the services available within the respective host complexes. For example, Instant Messaging allows a subscriber to use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the Web.

Typically, the OSP host complex 370 supports different services, such as email, discussion groups, chat, news services, and Internet access. The OSP host complex 370 generally is designed with an architecture that enables the machines within the OSP host complex 370 to communicate with each other, and to employ certain protocols (i.e., standards, formats, conventions, rules, and structures) to enable the transfer of data. The OSP host complex 370 ordinarily employs one or more OSP protocols and custom dialing engines to enable access by selected client applications. The OSP host complex 370 may define one or more specific protocols for each service based on a common, underlying proprietary protocol.

The IM host complex 380 may be independent of the OSP host complex 370, and may support instant messaging services irrespective of a subscriber's network or Internet access. Thus, the IM host complex 380 may be configured to allow subscribers to send and receive instant messages, whether or not they have access to any particular ISP. The IM host complex 380 may support associated services, such as administrative matters, advertising, directory services, chat, and interest groups related to the instant messaging. The IM host complex 380 has an architecture that enables all of the machines within the IM host complex to communicate with each other. To transfer data, the IM host complex 380 employs one or more standard or exclusive IM protocols.

The host system 330 may include one or more gateways that connect and therefore link complexes, such as the OSP host complex gateway 375 and the IM host complex gateway 385. The OSP host complex gateway 375 and the IM host complex gateway 385 may directly or indirectly link the OSP host complex 370 with the IM host complex 380 through a wired or wireless pathway. Ordinarily, when used to facilitate a link between complexes, the OSP host complex gateway 375 and the IM host complex gateway 385 are privy to information regarding a protocol anticipated by a destination complex, which enables any necessary protocol conversion to be performed incident to the transfer of data from one complex to another. For instance, the OSP host complex 370 and IM host complex 380 may use different protocols such that transferring data between the complexes requires protocol conversion by or at the request of the OSP host complex gateway 375 and/or the IM host complex gateway 385.

In one implementation, the host system 130 may maintain information related to the client devices 105 or to a user of the client devices 105. For example, such information may include parental control settings, wallet settings, personal web pages, instant messaging user lists, and any other type of personal settings or features or information associated with a particular client device 105 or a user of client device 105. In this implementation, it may be important to enable recognition of or distinction between different client devices 105 and/or users accessing the host system so that the stored information is not rendered useless, or worse yet, inaccurately applied.

Figure 4:
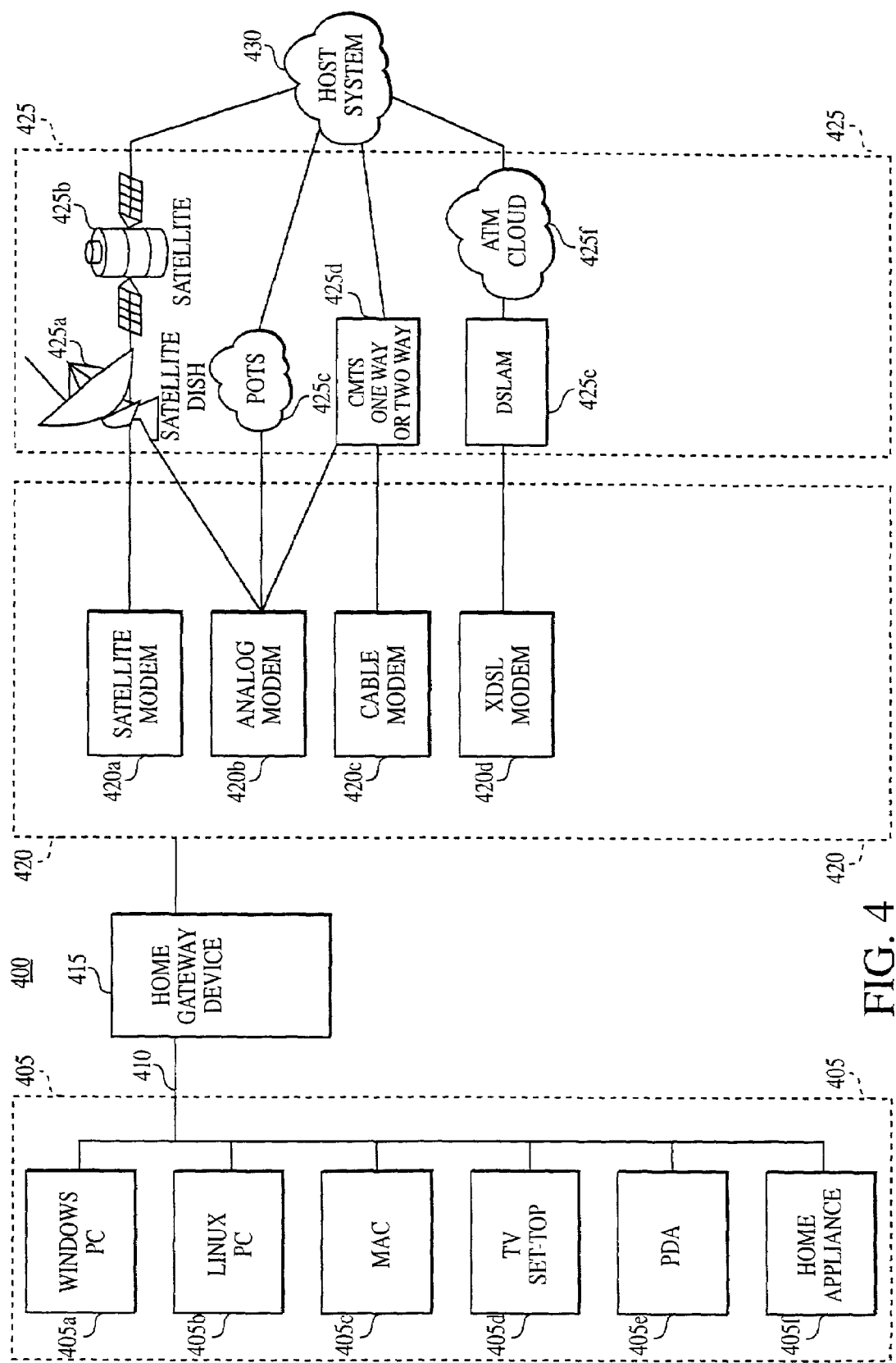
FIG. 4 is a block diagram of an implementation of the home networking system of FIG. 1.

FIG. 4 shows several implementations and possible combinations of devices and systems used within the home networking system 420. The client devices 405, the network 410, the home gateway device 415, the communication devices 420, the communication links 425, and the host system 430 typically correspond to their respective elements 105, 110, 115, 120, 125, and 130 illustrated in FIG. 1. The elements in FIG. 4, which have corresponding elements in FIG. 1, are not meant to limit the scope of the elements previously described with respect to FIG. 1, but instead are merely some possible examples of these elements.

Examples of client devices 405 may include, but are not limited to, a personal computer with a Windows™ operating system 405a, a personal computer with a Linux™ based operating system 405b, a Macintosh™ personal computer 405c, a television set-top box 405d, a PDA 405e, and an intelligent home appliance 405f. As described above with respect to FIG. 1, the client devices 405 are connected through a network 410 to the home gateway device 415.

The home gateway device 415 typically includes a communication device 420. Examples of the communication device 420 may include a satellite modem 420a, an analog modem 420b, a cable modem 420c, and an xDSL modem 420d. The home gateway device 415 uses the communication device 420 to communicate through communication links 425 with the host system 430. The communication links 425 may include various types of communication delivery systems that correspond to the type of communication device 420 being used. For example, if the home gateway device 415 includes a satellite modem 420a, then the communications from the client devices 405 and the home gateway device 415 may be delivered to the host system 430 using a satellite dish 425a and a satellite 425b. The analog modem 420b may use one of several communications links 425, such as the satellite dish 425a and satellite 425b, the Plain Old Telephone Service (POTS) 425c, and the Cable Modem Termination System (CMTS) 425d. The cable modem 420c typically uses the CMTS 425d to deliver and receive communications from the host system 430. The xDSL modem 420d typically delivers and receives communications with the host system 430 through a Digital Subscriber Line Access Multiplexer (DSLAM) 425e and an Asynchronous Transfer Mode (ATM) network 425f.

The home networking system 400 may use various protocols to communicate between the client devices 405 and the home gateway device 415 and between the home gateway device 415 and the host system 430. For example, a first protocol may be used to communicate between the client devices 405 and the home gateway device 415, and a second protocol may be used to communicate between the home gateway device 415 and the host system 430. In one implementation, the first protocol and the second protocol may be the same. In another implementation, the first protocol and the second protocol may be different. The home gateway device 415 may include different hardware and/or software modules to implement different home networking system protocols. Various implementations and alternatives to the home networking system architecture are discussed below.

PPPoE

Figure 5:
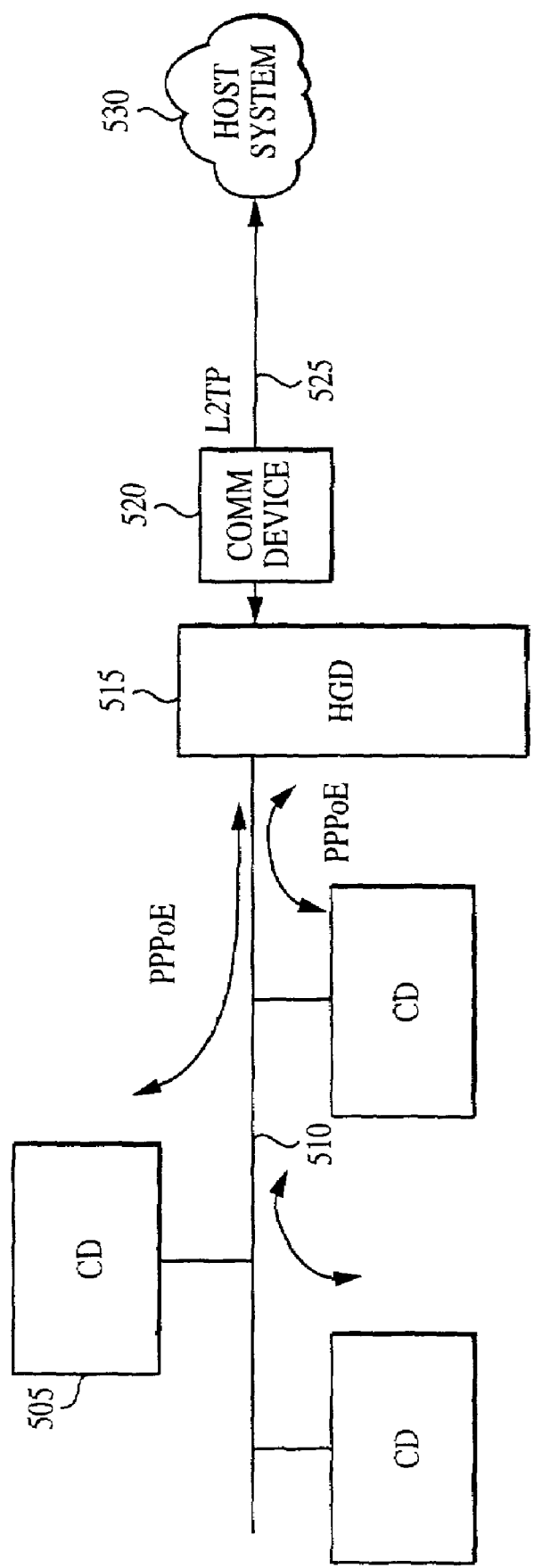
FIG. 5 is a block diagram of the home networking system of FIG. 1 illustrating one protocol implementation.

Referring to FIG. 5, the elements 505, 510, 515, 520, 525, and 530 typically correspond to the respective elements 105, 110, 115, 120, 125, and 130 of FIG. 1 and to respective elements 405, 410, 415, 420, 425, and 430 of FIG. 4. In one implementation, the client devices 505 communicate through the network 510 with the home gateway device 515 using Point-to-Point Protocol over Ethernet (PPPoE). The home gateway device 515 communicates with the host system 530 through the communication device 520 over communication links 525. For communications between the client devices 505 and the host system 530, the home gateway device 515 strips off the "oE" header from the PPPoE traffic used by the client devices 505, encapsulates the PPP traffic in Layer Two Tunneling Protocol (L2TP), then encapsulates the L2TP traffic in User Datagram Protocol (UDP), and passes on the encapsulated PPP communications to the host system 530. This architecture enables multiple client devices 505 to communicate simultaneously with the host system 530 over a single communication tunnel established between the home gateway device 515 and the host system 530 while allowing the host system 530 to recognize independent Internet addresses with respect to each of the client devices 505. This architecture also enables a one-to-one mapping of a PPPoE session to an L2TP session.

Figure 6:
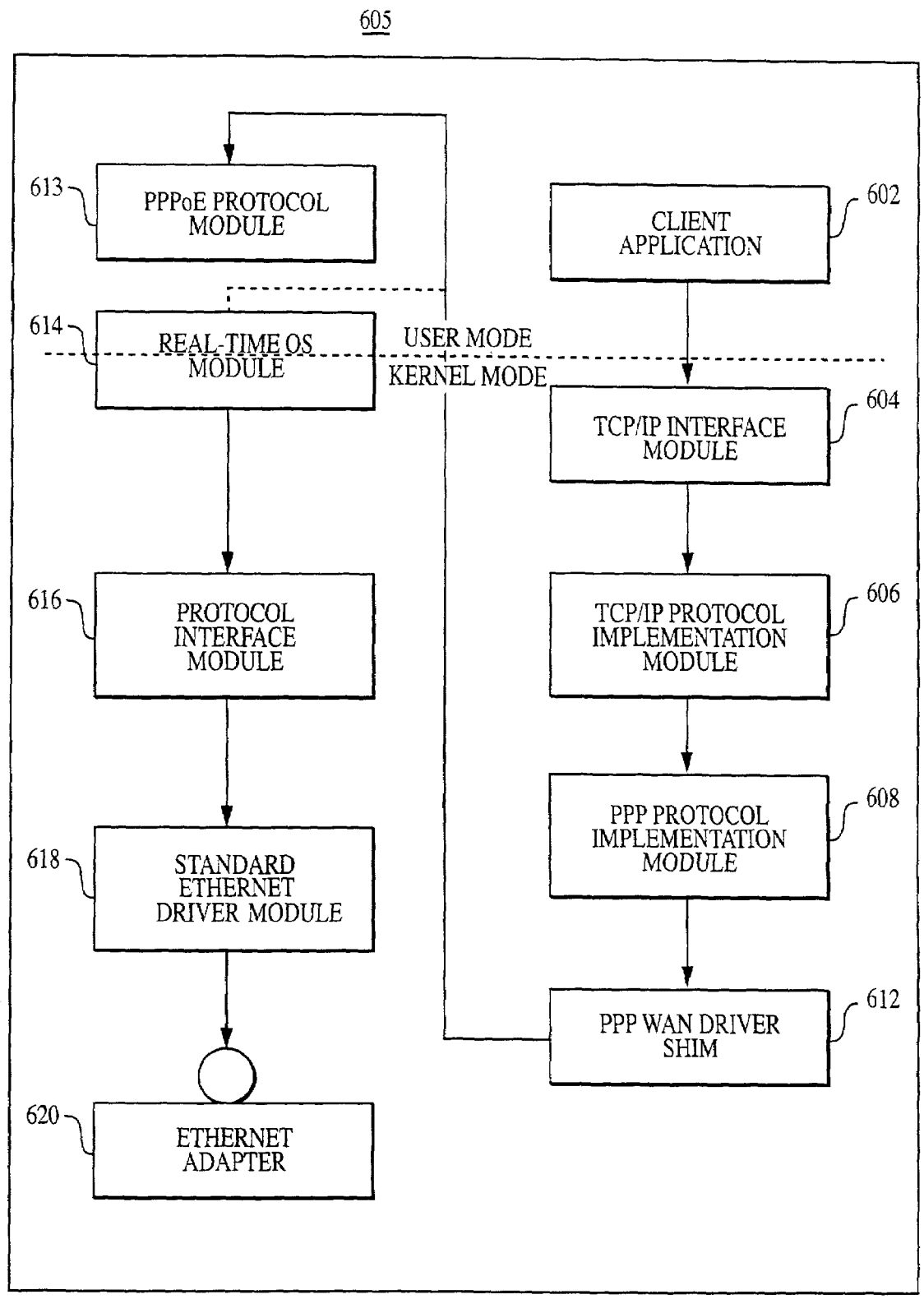
FIG. 6 is a block diagram of the components which may be included in a client device of the system of FIG. 1.

Referring to FIG. 6, in one implementation, the client device 605 may include one or more hardware and/or software modules, such as, for example, a client application 602, a TCP/IP interface module 604, a TCP/IP protocol implementation module 606, a PPP protocol implementation module 608, a PPP WAN driver SHIM module 612, a PPPoE protocol module 613, a real-time operating system (OS) 614, a protocol interface module 616, a standard Ethernet device driver interface module 618, and a standard Ethernet hardware adapter 620. The client device may use one or more of these modules to facilitate communications with other devices (e.g., the home gateway device 515 and the host system 530 through the home gateway device 515 from FIG. 5).

For example, the client application 602 may generate a request to initiate communications with the home gateway device (e.g., 515 from FIG. 5) and send outbound traffic (e.g., TCP/IP traffic going from the client device 605 to the home gateway device 515 from FIG. 5). The request may pass from the client application 602 through the TCP/IP interface module 604, which may allow for simultaneous support of multiple protocols between the client application level (e.g., User mode or Ring 3) and an operating system level (e.g., Kernel mode or Ring 0), and ultimately to the TCP/IP protocol implementation module 606. The TCP/IP protocol implementation module 606 typically operates in conjunction with the PPP protocol implementation module 608 and the PPP WAN driver SHIM module 612 to prepare and encapsulate the traffic in a protocol (e.g., encapsulate the TCP/IP traffic in PPP).

The real-time OS 614 may manage real-time interprocess communications between various protocols (e.g., between PPPoE and L2TP and between user and Kernel mode modules), including buffer management and task scheduling. The PPPoE protocol module 613 may add a header (e.g., an Ethernet header and a PPPoE header) to the traffic (e.g., TCP/IP traffic encapsulated in PPP) to enable the home gateway device (e.g., 515 from FIG. 5) to identify the particular client device 605 from which the traffic is originating. Thus, the traffic may be considered PPPoE. More specifically, in one example, the header may include address information learned during the PPPoE discovery stage, which is discussed in more detail below, and may append the "oE" header to the PPP encapsulated traffic. The real-time OS 614 typically calls the protocol interface module 616, which is typically bound to a Network Interface Card (NIC) (e.g., 256 from FIG. 2) and allows for the exchange of traffic between the NIC and the PPPoE protocol module 613. The traffic then is typically communicated to the home gateway device using the NIC, the standard Ethernet driver module 618, and the Ethernet adapter 620.

For inbound traffic (e.g., PPP traffic coming from the home gateway device to the client device 605), received traffic from the standard Ethernet driver module 618 is indicated to the protocol interface module 616. The PPPoE protocol module 613 receives the traffic from the protocol interface module 616 via the real-time OS 614. The PPPoE protocol module 613 strips off any header from the traffic (e.g., removing the "oE" header from the PPPoE traffic) and passes the traffic to the PPP WAN driver SHIM module 612. The PPP WAN driver SHIM module 612 then passes the traffic to the PPP protocol implementation module 608 for delivery to the TCP/IP protocol implementation module 606. The client application 602 receives traffic from the TCP/IP implementation module 606 via the TCP/IP interface module 604.

Figure 7:
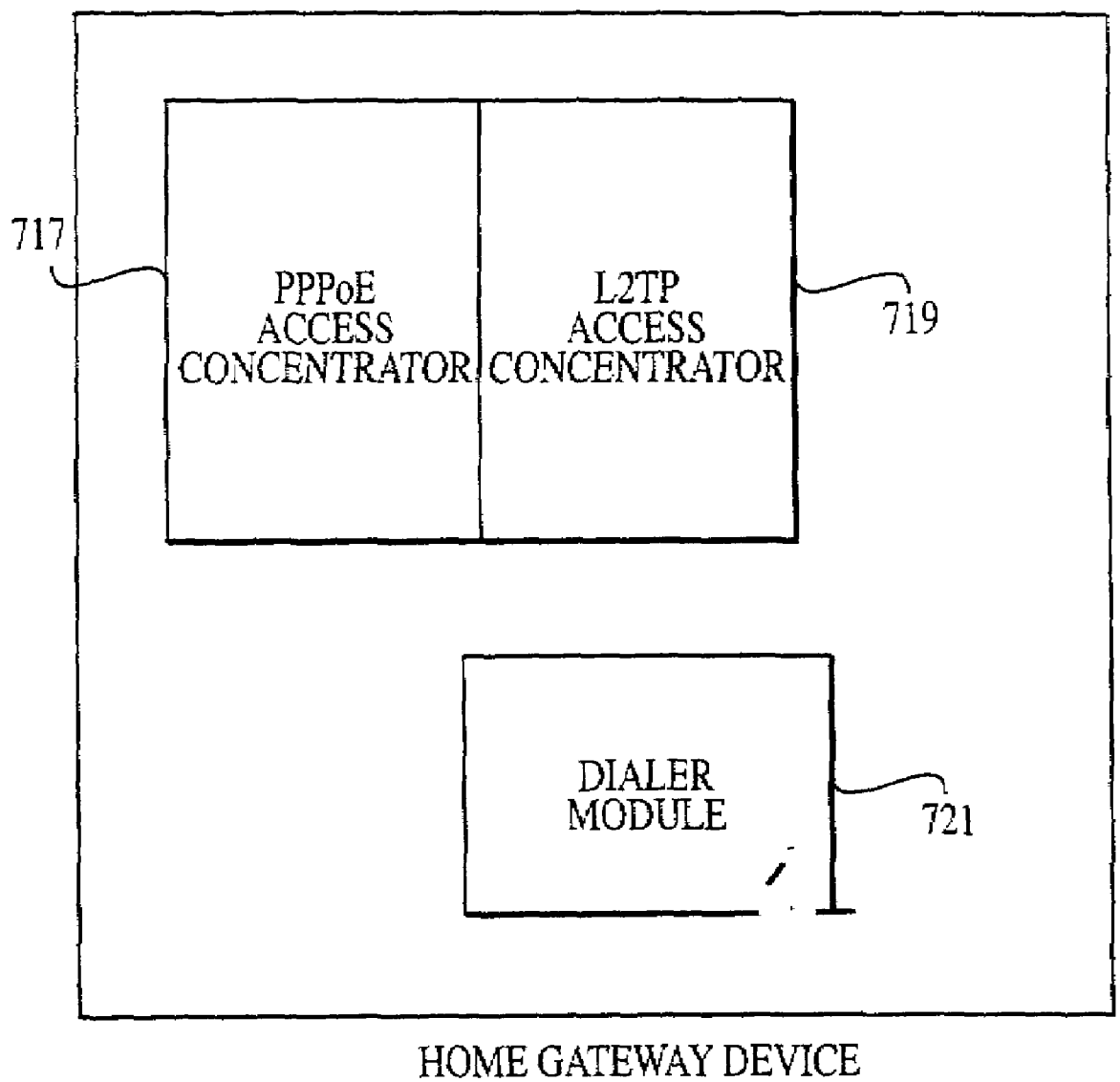
FIG. 7 is block diagram of the components which may be included in a home gateway device of the system of FIG. 1.

Referring to FIG. 7, in one implementation, the home gateway device 715 may include a PPPoE access concentrator 717, an L2TP access concentrator 719, and a dialer module 721. The home gateway device 715 uses L2TP to tunnel the PPP traffic from each client PPPoE session to the host system. A single L2TP tunnel is established between the home gateway device and the host system to carry multiple PPP sessions because L2TP provides a method to multiplex multiple PPP sessions within a single tunnel (e.g., multiple L2TP sessions). Thus, in this implementation, a first protocol is used between the client devices and the home gateway device 715, and a second protocol is used between the home gateway device 715 and the host system to enable individual communication sessions between the client devices and the host system. In particular, the first protocol includes PPPoE and the second protocol includes L2TP. The dialer module 721 may be configured with a unique identifier (e.g., a login name combined with a password) that enables the host system to identify the home gateway device 715.

Figure 8:
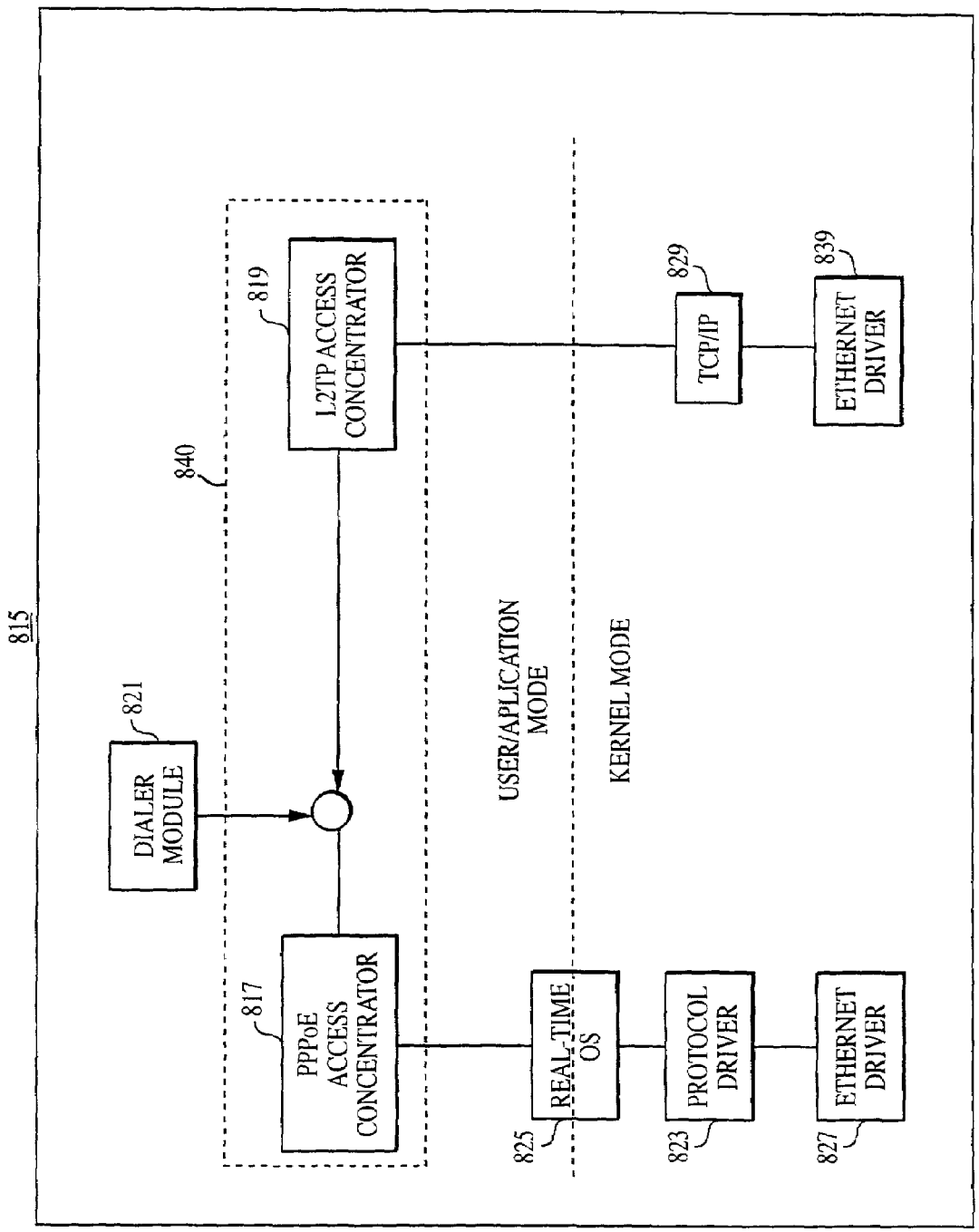
FIG. 8 is a more detailed block diagram of the home gateway device of FIG. 7.

FIG. 8 shows a more detailed block diagram of an exemplary home gateway device 815. In this implementation, the PPPoE access concentrator 817 and the L2TP access concentrator 819 include hardware and/or software which may be operated as user mode/Ring 3 applications.

The home gateway device 815 includes the PPPoE access concentrator 817 that enables communications with the client devices (e.g., 505 from FIG. 5). The PPPoE access concentrator 817 is capable of handling multiple, simultaneous PPP sessions with the PPPoE enabled client devices 505. Enabling each client device with its own PPP session permits the client device to receive its own unique identifier from the host system. The unique identifier may include, for example, an Internet address.

When the home gateway device 815 communicates with the client devices 505, a standard ethernet driver 823 is used to exchange Ethernet frames between the home gateway device 815 and the client devices 505. The home gateway device 815 employs a standard protocol driver 823 that, in conjunction with the real-time operating system (OS) 825, allows the exchange of Ethernet traffic from the client devices 505 with the PPPoE access concentrator 817. The protocol driver 823 binds to Ethernet driver 827 to facilitate the exchange of traffic between the home gateway device 815 and the PPPoE access concentrator 817. The real-time OS 825 typically provides the interprocess communication capability between protocol driver 823 and PPPoE access concentrator 817. When the home gateway device includes more than one Ethernet driver 827, the PPPoE access concentrator 817 uses the PPPoE discovery phase to identify which particular Ethernet driver 823 will be used to exchange traffic with a particular client device 505.

The L2TP access concentrator module 819 within the home gateway device 815 uses UDP over IP to exchange L2TP traffic with the host system (e.g., 530 from FIG. 5) using the standard TCP/IP module 829. When connectivity needs to be established with the host system 530, the dialer module 821 establishes connectivity to the host system 530 prior to the exchange of L2TP traffic between the L2TP access concentrator module 819 and the host system 530. Additionally, the dialer module 821 may calculate the host system 530 address, allowing the home gateway device 815 the potential to add a static route to the host system 530 in the home gateway device 815 routing table. This may prevent a new default route from interfering with the tunnel traffic between the home gateway device 815 and the host system 530. The real-time OS 825 may be used to provide interprocess communications between the PPPoE access concentrator 817 and the L2TP access concentrator module 819. Additionally or alternatively, the PPPoE access concentrator 817 and the L2TP access concentrator module 819 may be combined within the same module, as indicated by the dashed lines 840.

Figure 9A:
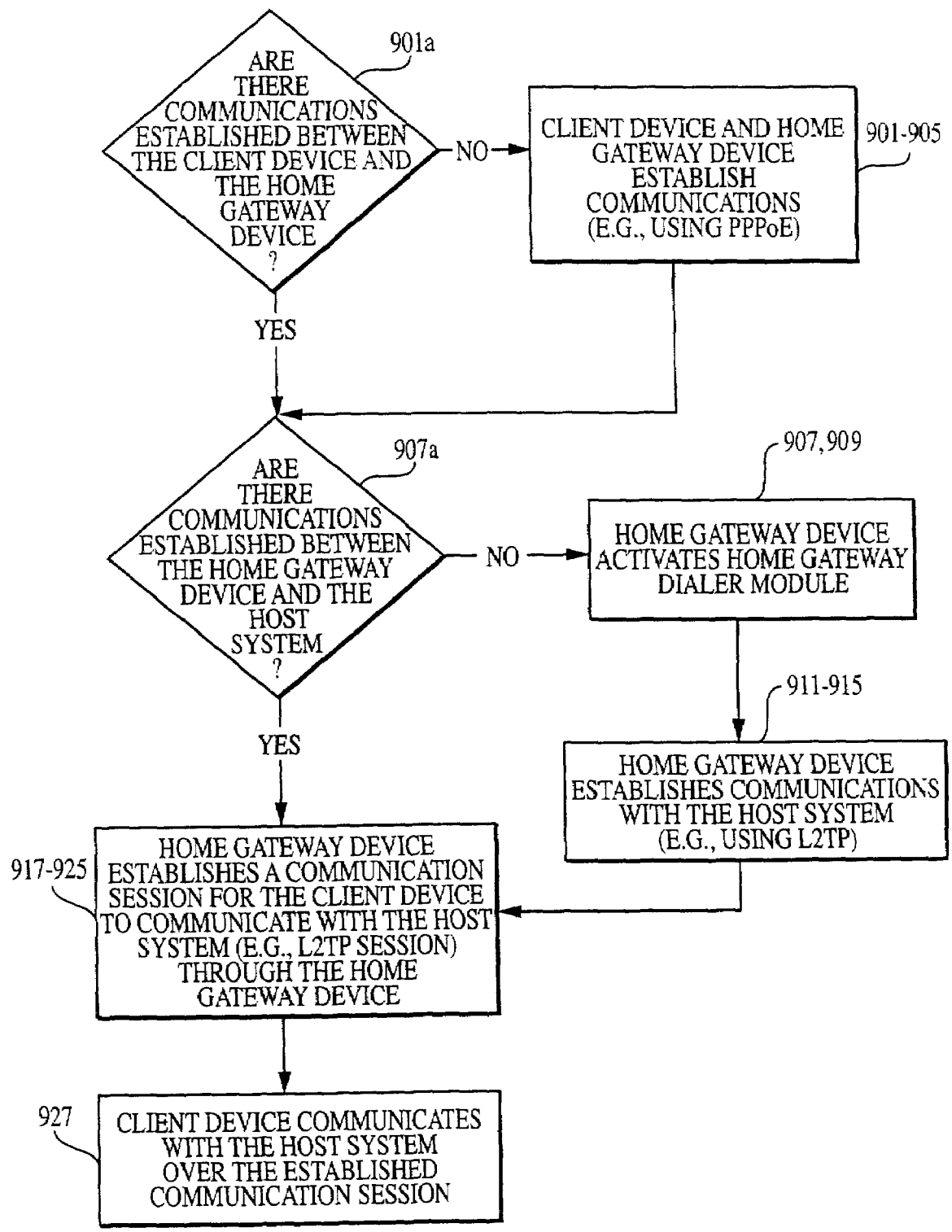
FIG. 9a is a flow chart of a process used to enable a home network.

FIG. 9a illustrates one implementation of a process for enabling communications between a client device and the host system, through the home gateway device. The client device typically initiates an action that indicates its desire to communicate with the host system, for example, by launching an application (e.g., a browser or a client application) or by sending a command and/or a request.

It is determined whether communications are established between the client device and the home gateway device (step 901a). If communications are not already established between the client device and the home gateway device (step 901a), then the client device and the home gateway device establish communications (steps 901-905). The client device and the home gateway device may, for example, establish communications using PPPoE (steps 901-905).

Once communications are established between the client device and the home gateway device (steps 901-905) or if communications between the client device and the home gateway device were already established (step 901a), then it is determined whether communications are established between the home gateway device and the host system (step 907a). If communications are not already established between the home gateway device and the host system (step 907a), then the home gateway device activates the home gateway dialer module (steps 907 and 909). The home gateway device then establishes communications with the host using the home gateway dialer module (steps 911-915). The home gateway device may, for example, establish communications using L2TP by setting up an L2TP tunnel over which multiple, individual L2TP sessions may be established.

Once communications are established between the home gateway device and the host system (steps 911-915) or if communications between the home gateway device and the host system were already established (step 907a), then the home gateway device establishes a communication session for the client device to communicate with the host system (steps 917-925). The communication session may, for example, include an L2TP session created over the established L2TP tunnel. Thus, the client device and the host system are enabled to communicate over the established communication session (step 927).

Figure 9B:
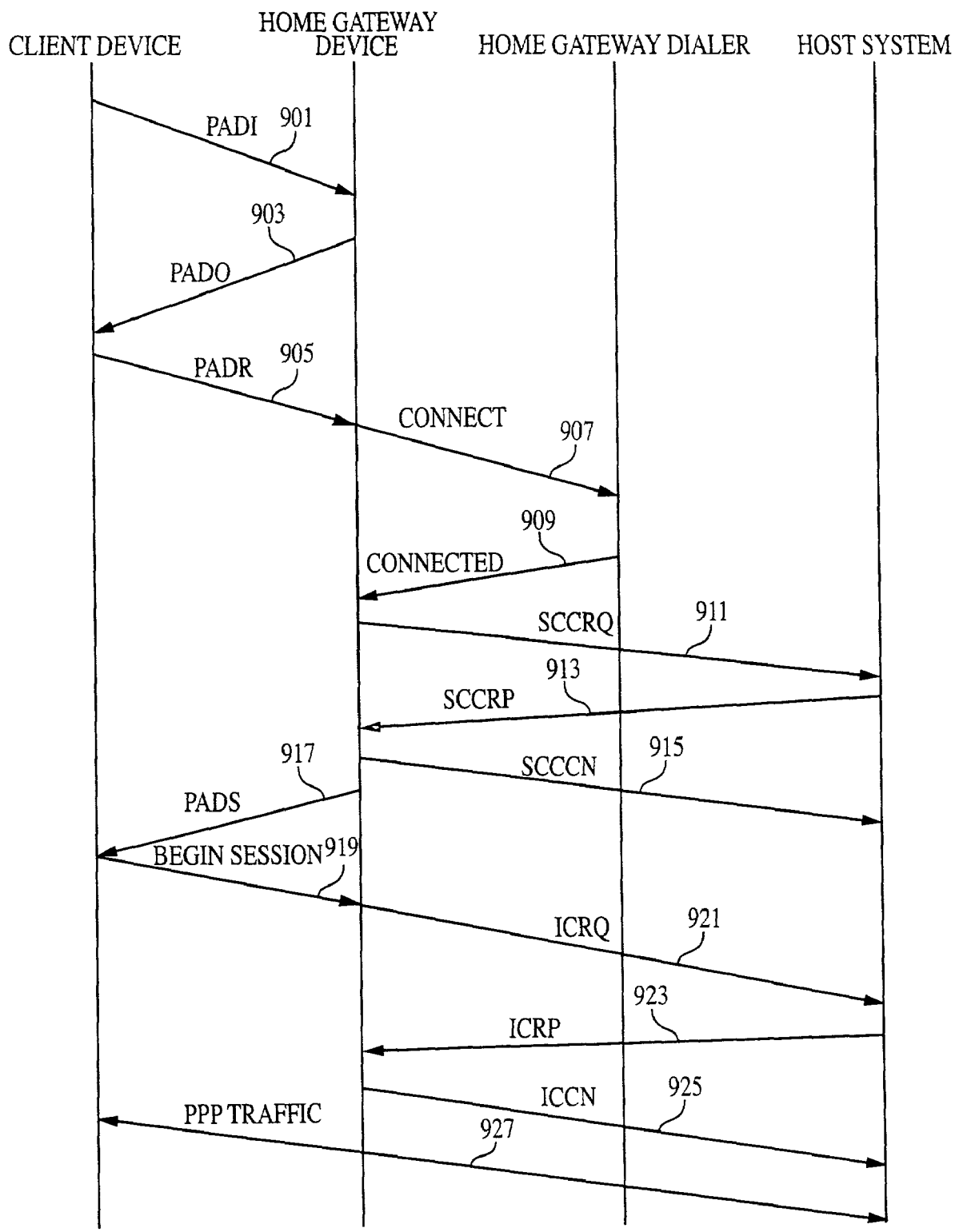
FIG. 9b is a flow chart of a process used to enable a home network.

More particularly, one specific implementation of the process shown by FIG. 9a is described with respect to FIG. 9b. Referring to FIG. 9b, a client device initiates a communication with the host system by initiating the PPPoE discovery phase. Discovery starts with a broadcast of the PPPoE Active Discovery Initiation (PADI) packet from the client device to the home gateway device (step 901). If the gateway device is present and the server software is running, the home gateway device responds with a directed ethernet frame containing a PPPoE Active Discovery Offer (PADO) packet (step 903). The client device typically responds to the PADO packet with a PPPoE Active Discovery Request (PADR) packet (i.e., a directed ethernet frame using the server's media access control (MAC) address as the destination address) (step 905).

When the home gateway device receives the PADR packet, an L2TP tunnel is needed to the host system to enable the client device to begin sending PPP traffic, which will end up being tunneled through the L2TP session to the host system. The L2TP tunnel typically is created between the home gateway device and an LNS, which is a component of the host system. When the home gateway device receives the PADR packet, a dialer module within the home gateway device is triggered to send a command to establish a connection with the host system (step 907). The connection type is based on the client device's configuration of the configurable home gateway dialer. For example, the home gateway dialer may support various types of connections such as, dial-up modem, xDSL, cable, satellite, and any other type of connection. One process of establishing connections using or through the home gateway dialer is discussed further below.

Once the dialer is connected (step 909), the home gateway device begins sending messages to the host system to create the L2TP tunnel. The process of creating the L2TP tunnel begins with the Start-Control-Request (SCCRQ) message (step 911). The LNS responds with a Start-Control-Connection-Reply (SCCRP) message (step 913). The SCCRP message indicates the LNS is able to bring up and establish the L2TP tunnel. The tunnel establishment is complete when the home gateway device sends a Start-Control-Connection-Connected (SCCCN) message (step 915).

At or about the same time that the home gateway device sends the SCCCN message, the home gateway device also sends a PPPoE Active Discovery Session-confirmation (PADS) message to the client device (step 917). The PADS message indicates to the client device that it may begin sending PPP traffic to the host system. When the home gateway device receives PPP traffic from the client device (step 919), the home gateway device opens an L2TP session across the L2TP tunnel that was just created between the home gateway device and the host system.

The L2TP session is initiated when the home gateway device sends an incoming call request (ICRQ) (step 921). The LNS within the host system responds with an incoming call reply (ICRP) (step 923). Finally, the home gateway device completes the handshake by sending an incoming call connected (ICCN) message (step 925). At that point, PPP traffic is tunneled by the home gateway device for an end-to-end exchange between the client device and the host system (step 927). Thus, PPPoE is used to deliver the PPP traffic from the client device to the home gateway device. More particularly, the PPPoE traffic is sent to the PPPoE access concentrator (817 from FIG. 8) within the home gateway device (815 from FIG. 8). The home gateway device 815 strips off the PPPoE header leaving the PPP traffic. The home gateway device 815 then replaces the PPPoE header with a valid L2TP session header so that the original PPP traffic is sent in the L2TP tunnel to the host system via the L2TP access concentrator (819 from FIG. 8). Multiple L2TP sessions may be established simultaneously over the same L2TP tunnel.

Figure 10A:
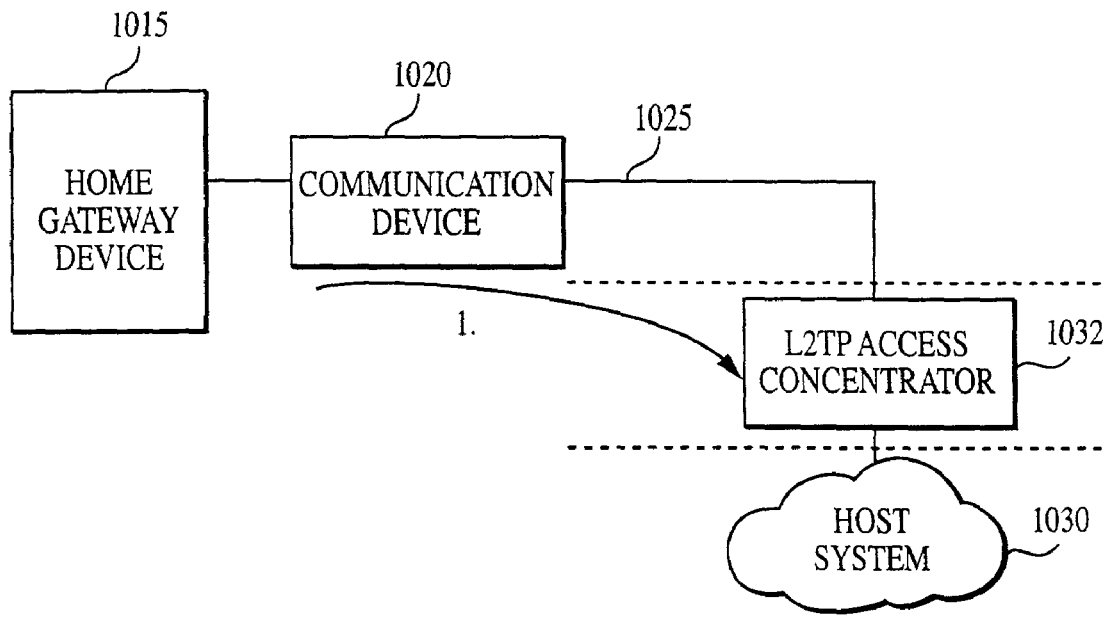
FIGS. 10a-10d are block diagrams of a protocol enabling communication between the components of the home networking system.

FIG. 10*a* illustrates a more detailed discussion of protocols that may be used to enable communications between the client devices (not shown), the home gateway device 1015, and the host system 1030. After the client device initiates the PPP discovery phase with the home gateway device 1015, the home gateway device 1015 initiates communications with the host system 1030. The home gateway device 1015, as discussed above, may use a communication device 1020, such as a modem (e.g., analog modem or dial-up modem), a cable modem, a satellite modem, or a DSL modem, to communicate with the host system 1030. The dialer module within the home gateway device 1015 (e.g., dialer module 821 of FIG. 8) initiates communications with host system 1030 by making a call to an L2TP enabled POP ("Point of Presence"), which may or may not reside within the host system 1030. Specifically, the dialer module initiates a call with an L2TP access concentrator (LAC) 1032, which is located within the POP and which may or may not reside within the host system 1030 (step 1000-1 of FIG. 10*a*).

Figure 10B:
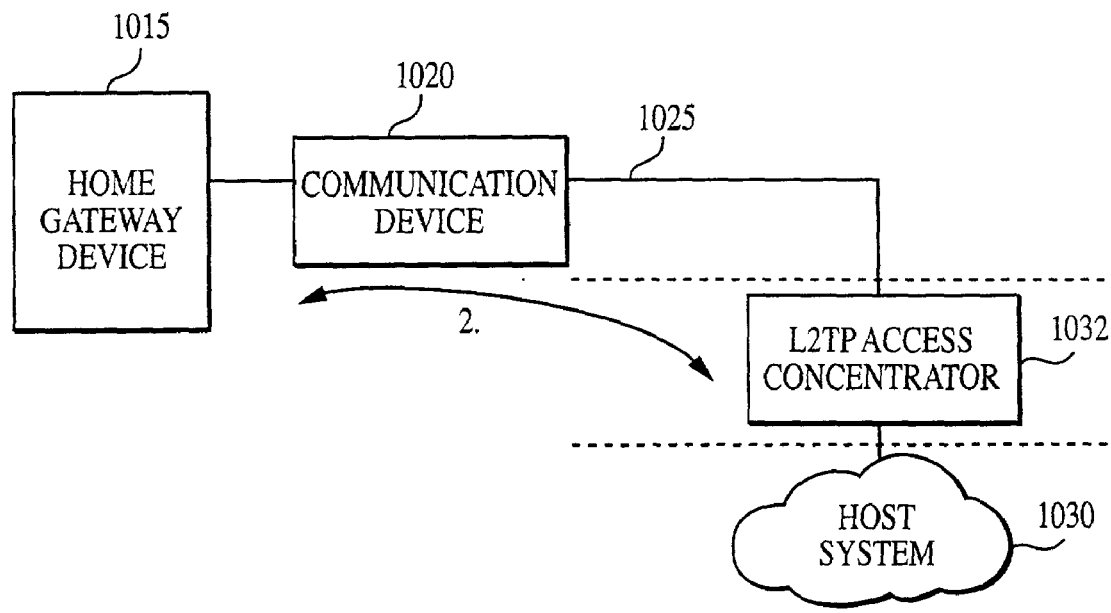

Referring to FIG. 10*b*, following the call from the dialer module to the LAC 1032, PPP is typically partially negotiated through the dialer module's dial-up network connection to the LAC 1032 (step 1000-2 of FIG. 10*b*). The PPP Link Control Protocol (LCP) layer is negotiated and the process of authentication starts by communicating a login sequence from the home gateway device 1015 to the LAC 1032.

Figure 10C:
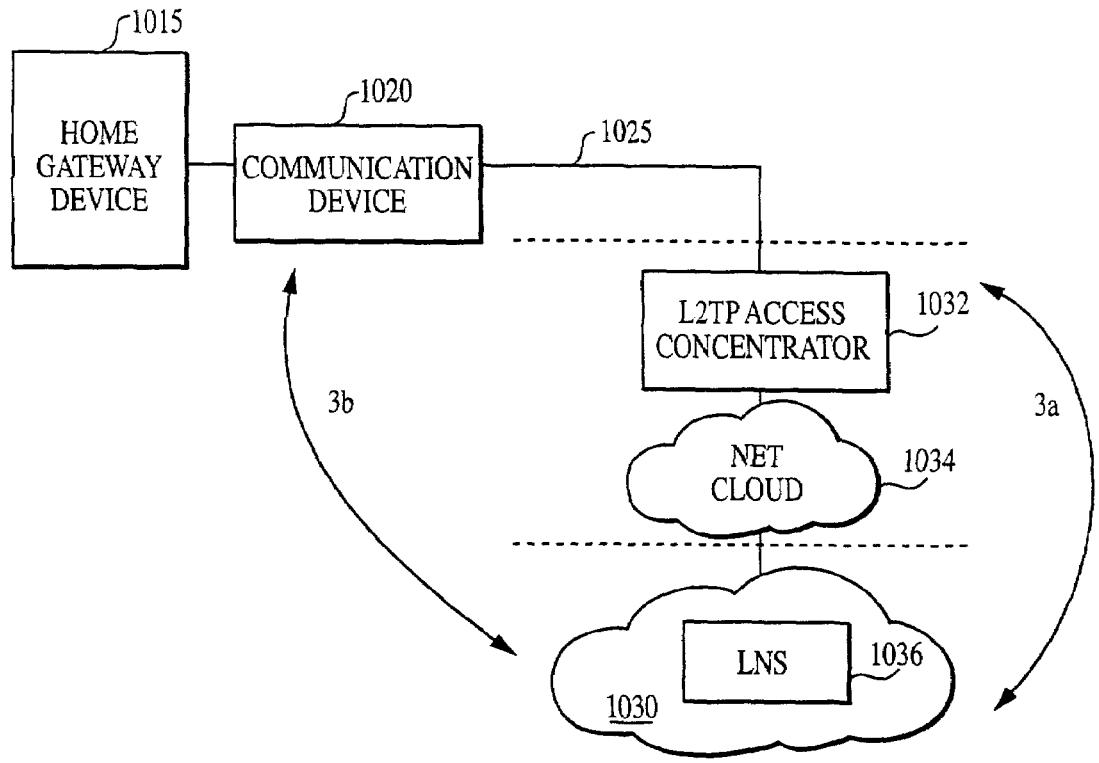

Referring to FIG. 10*c*, the LAC 1032 notifies the L2TP Network Server (LNS) 1036, which typically is a component of the host system 1030, that a login sequence and authentication process has been initiated by the home gateway device 1015. The LAC 1032 may conduct a radius lookup to identify a particular LNS with which to communicate. The LNS then restarts LCP negotiation with the dialer module (step 1000-3*a* of FIG. 10*c*). After renegotiating LCP, as illustrated by FIG. 10*c*, the LNS 1036 and the dialer module negotiate authentication and Internet Protocol Control Protocol (IPCP) (step 1000-3*b* of FIG. 10*c*).

Figure 10D:
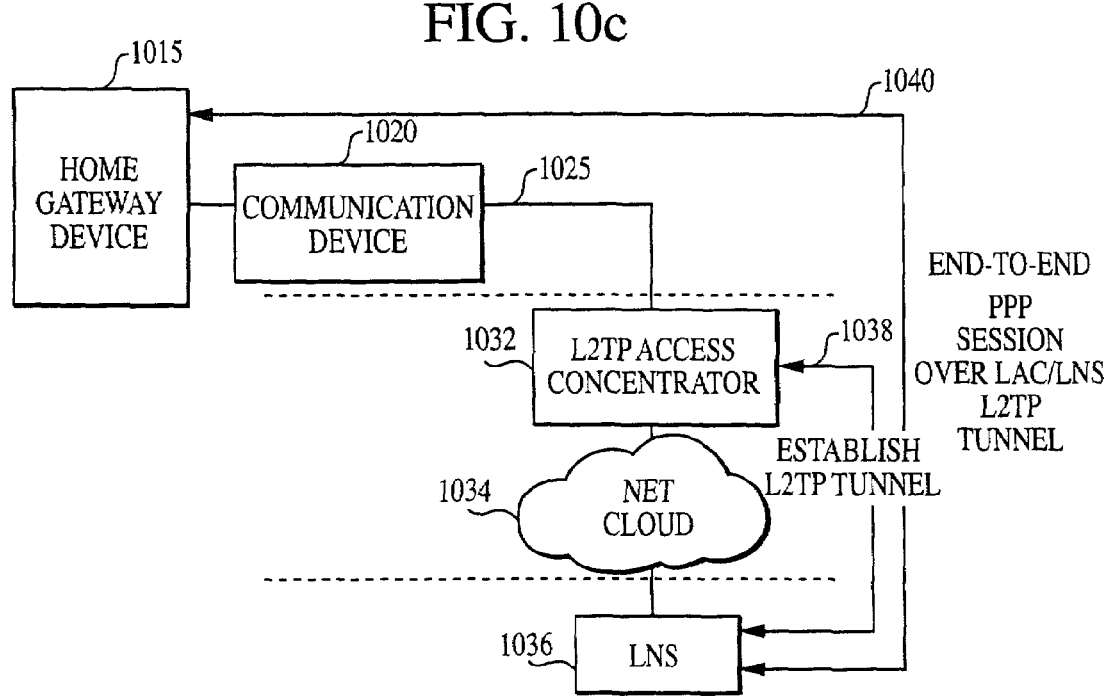

Referring to FIG. 10*d*, for the LNS 1036 to complete this PPP negotiation, the POP's LAC 1032 first creates a tunnel 1038, and then starts a session over that tunnel. Once the tunnel 1038 is established, the home gateway device 1015 creates its own tunnel to the LNS 1036, as illustrated in FIG. 10*d*. As shown, an end-to-end PPP session 1040 is established between the home gateway device 1015 and the LNS 1036 which is over the LAC/LNS L2TP tunnel 1038. Thereafter, for each client device that requests connection to the host system 1030, the home gateway device 1015 will open a new L2TP session over its established tunnel 1040.

During the connectivity process between the dialer module within the home gateway device 1015 and the host system 1030, the host system 1030 assigns the dialer module a unique identifier, such as an assigned Internet protocol address. The dialer module typically includes software code to perform this function. For instance, the dialer module may be configured with a unique identifier which allows the dialer module access to the host system 1030 through an authentication process. The unique identifier may include a screen name and an associated password.

Network Address Translation

Figure 11:
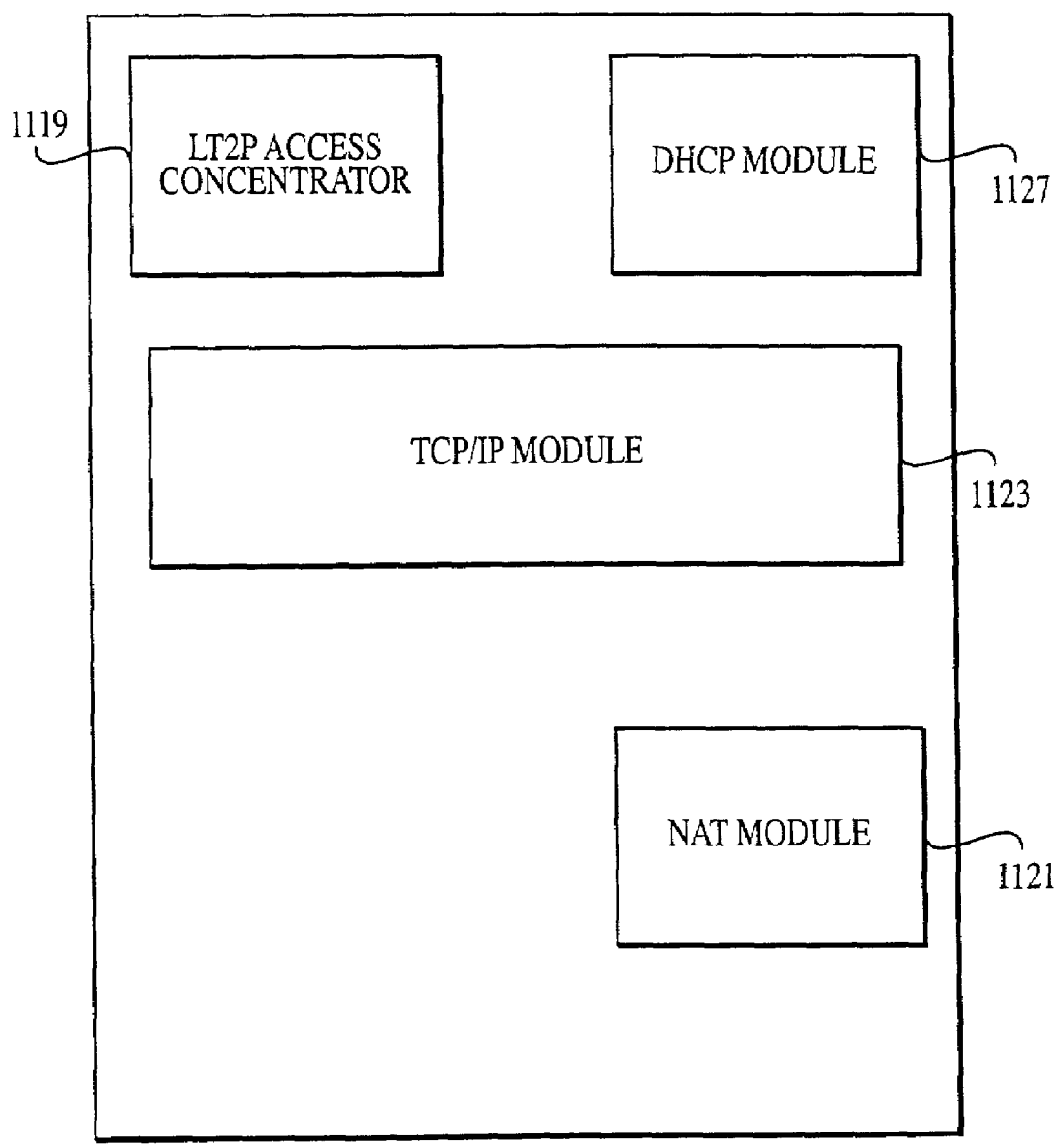
FIG. 11 is a block diagram of the home gateway device including a NAT module.

Referring to FIG. 11, in another implementation, the home gateway device 1115 may include an L2TP access concentrator 1119 to communicate with the host system, a Network Address Translator (NAT) module 1121 that facilitates communications with the client devices, and a TCP/IP module 1123. The home gateway device 1115, which includes the NAT module 1121, enables the host system to assign independent Internet addresses associated with each home-networked client device over a single communication tunnel that is established between the home gateway device and the host system. In one implementation, the home gateway device 1115 uses the NAT module 1121 to map the host-assigned addresses to local addresses associated with each client device. This enables the client devices or a user of the client devices to access individual information maintained by the host system. This also enables the host system to enforce host-based controls (e.g., parental controls) for each individual client device and/or a user of each client device.

As described above, the home gateway device 1115 typically establishes a connection with the host system using the L2TP access concentrator 1119. The L2TP access concentrator 1119 establishes the L2TP tunnel with the LNS in the host system, as described above with respect to FIGS. 10*a*-10*d*.

In one implementation, the home gateway device 1115 may assign the client devices local addresses to identify and facilitate individual communications between the home gateway device 1115 and the client devices. The home gateway device may include a Dynamic Host Configuration Protocol (DHCP) module 1127, which may assign the local addresses (e.g., local IP addresses) to the client devices. The client devices typically include a DHCP client module (e.g., Windows™ DHCP), which may seek a local address from the home gateway device 1115 (e.g., at startup or at some other time). The DHCP module 1127 also may assign the home gateway device 1115 as the default route for each client device.

Additionally or alternatively, the client devices may be configured with manually assigned local addresses (e.g., static IP addresses) that are recognized by and made known to the home gateway device 1115. The home gateway device 1115 functions to map the locally assigned addresses between the client devices and the home gateway device 1115 to the host system assigned addresses between the host system and the client devices. In this manner, the host system is capable of recognizing the individual client device that is communicating with the host system.

Figure 12:
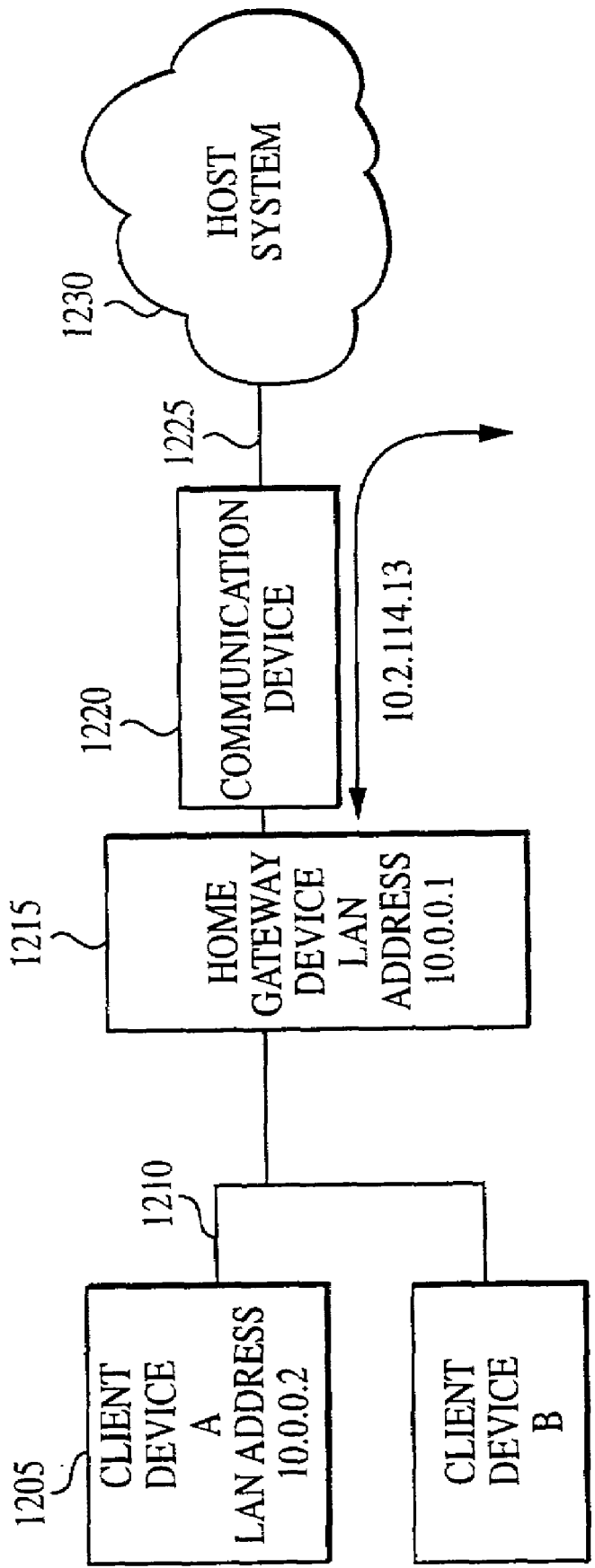
FIG. 12 is a block diagram of the home networking system using a NAT module.

Referring to FIG. 12, the client devices 1205 typically include software that enables generation of IP traffic from the client devices 1205 to an outside entity. The client device 1205 attempts to communicate with the host system 1230. The attempt generates IP traffic from the client device 1205 to the host system 1230. Information included within the IP traffic typically includes a destination address specifying a location within the host system 1230. The client device 1205 may be configured to route traffic destined for the host system 1230 or traffic destined outside of the home local network 1210 to a default routing table. Thus, the traffic destined for the host system 1230 is sent to the home gateway device 1215. The home gateway device 1215 typically examines the traffic from the client devices 1205 and monitors for traffic from a new source. When the home gateway device 1215 recognizes traffic destined for the host system 1230 from a new source, the home gateway device 1215 establishes communications with the host system 1230, for example, by creating an L2TP tunnel with an LNS (not shown) and obtains an IP address for the home gateway device 1215. In this manner, the home gateway device 1215 and the host system 1230 establish the L2TP tunnel over the communication links 1225.

After the L2TP tunnel has been established, the home gateway device 1215 and the host system 1230 establish an L2TP session over the L2TP tunnel, which is associated with the client device 1205 requesting access to the host system 1230. Once the L2TP session is established, the host system 1230 assigns the home gateway device 1215 an IP address for that particular L2TP session. The home gateway device 1215 maps the host-assigned IP address to the client device 1205 local address, thus allowing communications between the client device 1205 and the host system 1230 to occur using an independent host-assigned Internet address. The home gateway device 1215 will continue mapping the Internet address provided by the host system 1230 to the client device's 1205 local address as long as the L2TP session remains connected.

For example, as shown in FIG. 12, if the client device A 1205 has a local address of 10.0.0.2 and the address assigned by host system 1205 to client device A is 10.2.114.13, then the home gateway device 1215 maps 10.0.0.2 with 10.2.114.13. From the client's perspective, the home gateway device 1215 replaces the source IP address from client device A (10.0.0.2) with a valid host-assigned address (10.2.114.13) for all of client device A's 1205 outbound traffic. For inbound traffic, the home gateway device 1215 replaces the destination address (10.2.114.13) with (10.0.0.2) and then forwards the traffic on the network 1210 between the home gateway device 1215 and the client devices to client device A 1205. Thus, a one-to-one mapping exists between IP address 10.0.0.2 and 10.2.114.13. From the perspective of the host system 1230, the host system 1230 recognizes client device A 1205 as 10.2.114.13.

The network address translation mapping scheme enables the host system 1230 to provide the client device access to information maintained by the host system for that particular client device. The mapping scheme also enables the user of the client device 1205 to access user specific information maintained by the host system 1230. Such information maintained by the host system 1230 may include, for example, parental control settings, wallet settings, and personal web page settings.

Additionally, the network address translation module within the home gateway device 1215 enables the home gateway device 1215 to use this mapping scheme for multiple client devices 1205 over the single communication tunnel 1225 (e.g., by establishing multiple L2TP sessions over the single L2TP tunnel). The home gateway device 1215 may process the mapping scheme for many unique addresses that the home gateway device 1215 senses over the network 1210 between the client devices 1205 and the home network device 1215. Additionally or alternatively, the home gateway device 1215 may limit the number of simultaneous L2TP sessions it allows.

In this implementation, the client devices typically are TCP/IP enabled and may use various software components (e.g., Microsoft™ TCP/IP stack) that enable TCP/IP communications. When using a NAT module within the home gateway device 1215, the client devices 1205 may not need to be PPP enabled.

Dynamic Host Configuration Protocol

Figure 13:
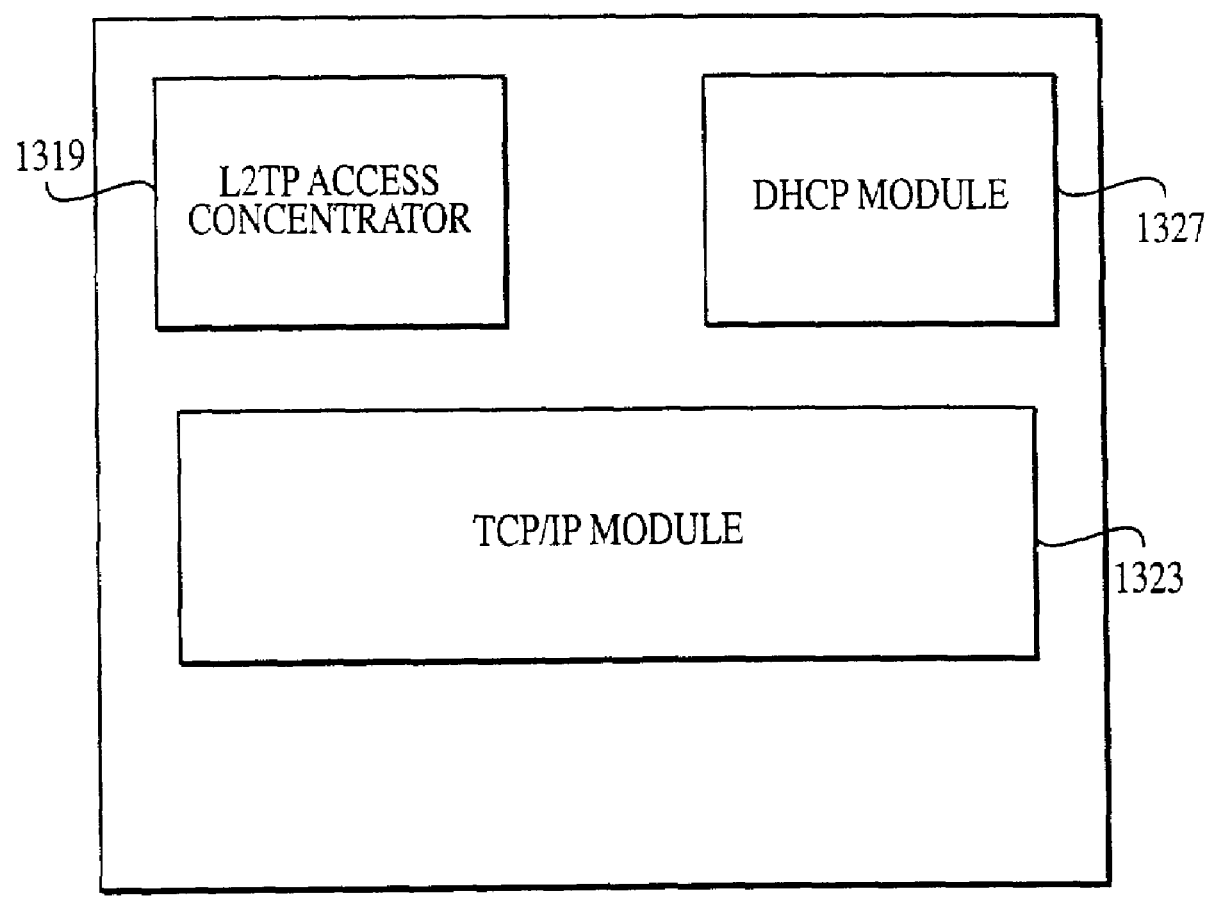
FIG. 13 is a block diagram of the home gateway device including a DHCP module.

Referring to FIG. 13, in another implementation, the home networking system may be implemented using a home gateway device 1315, which includes a Dynamic Host Configuration Protocol (DHCP) module 1327 that enables the host system to recognize individual client devices (505 from FIG. 5). The home gateway device 1315 also includes an L2TP access concentrator 1319 and a TCP/IP module 1323, which facilitate communications with the host system (530 from FIG. 5).

In this implementation, the home gateway device 1315 and the host system 530 typically communicate over a broadband communications link (e.g., xDLS, satellite, and cable) (525 from FIG. 5) such that a continuous connection between the home gateway device 1315 and the host system 530 is possible.

Figure 14:
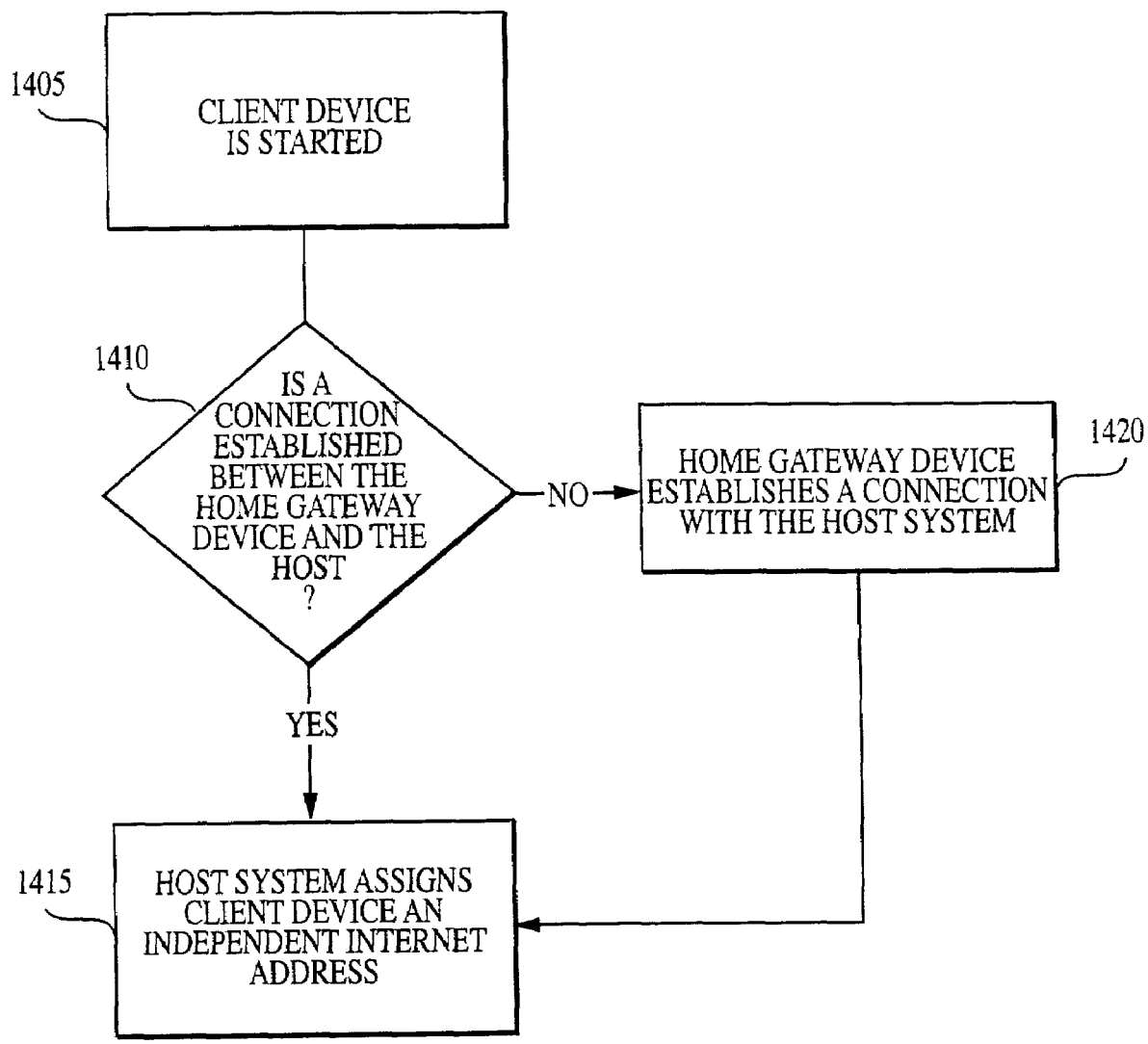
FIG. 14 is a flow chart of a process used to enable a home network.

Referring to FIG. 14, in one example, when a client device 505 that is DHCP capable is started (step 1405) and a determination is made as to whether a connection between the home gateway device 1315 and the host system 530 is already established (step 1410). If the connection is already established, the client device 505 is assigned an independent Internet address by the host system 530 (step 1415). The host-assigned independent address may function as both a local address for use on the network (510 from FIG. 5) between the client device 505 and the home gateway device 1315, and as an external address for use between the client device 505 and the host system 530. Multiple DHCP-capable client devices 505 may receive independent Internet addresses from the host system 530 using the single communication tunnel 525 between the home gateway device 1315 and the host system 530.

If the connection between the home gateway device 1315 and the host system 530 is not already established (step 1410), then the starting of the client device 505 triggers the home gateway device 1315 to establish a continuous connection with the host system 530 (step 1420). Once the connection between the home gateway device 1315 and the host system 530 is established, the host system 530 assigns the client device 505 the independent IP address (step 1415).

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program maybe implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

A number of implementations have been described. Nevertheless, it will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A system for connecting multiple home-networked client devices to a host system, wherein the host system assigns independent Internet addresses to the home-networked client devices, the system comprising:
    a home gateway device which includes a communication device to communicate with the host system over a single communication tunnel established between the home gateway device and the host system, wherein the home gateway device includes a network address translation module; and
    multiple home-networked client devices connected to the home gateway device via a network and that communicate with the host system through the home gateway device over the single communication tunnel,
    wherein the host system is located at one end of the single communication tunnel and is configured to establish individual communication sessions with the multiple home-networked client devices over the single communication tunnel and to assign independent Internet addresses to each of the multiple home-networked client devices over the single communication tunnel.

2. The system of claim 1 wherein the home gateway device is physically located in a personal residence.

3. The system of claim 2 wherein the personal residence is a single family dwelling.

4. The system of claim 1 wherein the home gateway device and the multiple home-networked client devices are physically located in a personal residence.

5. The system of claim 4 wherein the personal residence is a single family dwelling.

6. The system of claim 2 wherein the multiple home-networked client devices include wireless client devices that are connected to the home gateway device via a wireless network.

7. The system of claim 6 wherein the wireless client devices operate outside of the personal residence.

8. The system of claim 1 wherein the multiple home-networked client devices establish simultaneous individual communication sessions with the host system over the single communication tunnel and each of the multiple home-networked client devices is assigned an independent Internet address by the host system.

9. The system of claim 1 wherein the host system includes an Internet Service Provider.

10. The system of claim 1 wherein the network address translation module includes a port-based network address translation module.

11. The system of claim 1 wherein the network address translation module includes an address-based network address translation module.

12. The system of claim 1 wherein the home gateway device communicates with the multiple home-networked client devices using a first protocol and communicates with the host system using a second protocol.

13. The system of claim 12 wherein the first protocol and the second protocol are the same.

14. The system of claim 12 wherein the second protocol differs from the first protocol.

15. The system of claim 12 wherein:
    the first protocol is TCP/IP; and
    the second protocol is L2TP.

16. The system of claim 15 wherein the home gateway device includes:
    a network address translation module; and
    an L2TP access concentrator.

17. The system of claim 16 wherein the network address translation module includes a port-based network address translation module.

18. The system of claim 16 wherein the network address translation module includes an address-based network address translation module.

19. The system of claim 18 wherein the network address translation module interfaces with the multiple home-networked client devices and the host system to route communications between the host system to the multiple home-networked client devices by translating the independent Internet addresses assigned by the host system to the multiple home-networked client devices and local addresses belonging to the multiple home-networked client devices that are used on the network between the home gateway device and the multiple home-networked client devices.

20. The system of claim 19 wherein the multiple home-networked client devices are recognized by the host system as independent client devices through the use of unique identifiers.

21. A method for connecting multiple home-networked client devices to a host system, wherein the host system assigns independent Internet addresses to the home-networked client devices, the method comprising:
    using the home gateway device to receive a request from at least one of multiple home-networked client devices to communicate with the host system, wherein the multiple home-networked client devices are connected to the home gateway device via a network;
    using the home gateway device to establish communications with the host system over a single communication tunnel, wherein the home gateway device includes a network address translator module;
    using the home gateway device to receive independent Internet addresses from the host system, located at one end of the single communication tunnel, for each of the multiple home-networked client devices over the single communication tunnel;
    using the home gateway device to establish an individual communication session with the host system over the single communication tunnel, wherein the individual communication session is based on an independent Internet address assigned by the host system to the at least one of the multiple home-networked client devices that requested to communicate with the host system; and
    using the network address translator module to process communications between the at least one of the multiple home-networked client devices and the host system by mapping the independent Internet address assigned by the host system for the at least one of the multiple home-networked client devices to a local address used between the home gateway device and the at least one of the multiple home-networked client devices.

22. The method of claim 21 further comprising physically locating the home gateway device in a personal residence such that the request is received in the personal residence.

23. The method of claim 22 wherein the personal residence is a single family dwelling such that the request is received in the single family dwelling.

24. The method of claim 21 further comprising physically locating the home gateway device and the multiple home-networked client devices in a personal residence such that the request is received in the personal residence.

25. The method of claim 24 wherein the personal residence is a single family dwelling such that the request is received in the single family dwelling.

26. The method of claim 21 further comprising:
using the home gateway device to establish with the host system multiple simultaneous individual communication sessions over the single communication tunnel, wherein the multiple simultaneous individual communication sessions are each based on an independent Internet address assigned to the multiple home-networked client devices that request to communicate with the host system; and
using the home gateway device to process communications between the multiple home-networked client devices and the host system.

27. The method of claim 21 wherein the host system includes an Internet Service Provider.

28. The method of claim 21 wherein using the network address translator module to process communications between the at least one of the multiple home-networked client devices and the host system includes:
using the home gateway device to communicate with the at least one of the multiple home-networked client devices using a first protocol; and
using the home gateway device to communicate with the host system using a second protocol.

29. The method of claim 28 wherein the first protocol and the second protocol are the same.

30. The method of claim 28 wherein the second protocol differs from the first protocol.

31. The method of claim 28 wherein the first protocol includes TCP/IP and the second protocol includes L2TP.

32. The method of claim 21 wherein using the network address translator module to process communications between the at least one of the multiple home-networked client devices and the host system includes:
removing a first header including the local address from the communications received from the at least one of the multiple home-networked client devices destined for the host system;
adding a second header including the independent Internet address to the communications; and
sending the communications with the second header to the host system.

33. The method of claim 32 wherein using the network address translator module to process communications between the at least one of the multiple home-networked client devices and the host system includes:
removing a third header including the independent Internet address from the communications received from the host system destined for the at least one of the multiple home-networked client devices;
adding a fourth header including the local address; and
sending the communications with the fourth header to the at least one of the multiple home-networked client devices.

34. A method for connecting multiple home-networked client devices to a host system, wherein the host system assigns independent Internet addresses to the home-networked client devices, the method comprising:
using a host system, located at one end of a single communication tunnel, to assign independent Internet addresses to each of multiple home-networked client devices over the single communication tunnel;
using the host system to receive a request for an individual communication session with at least one of the multiple home-networked client devices;
using the host system to establish communications with the home gateway device that includes a network address translator module over the single communication tunnel;
using the host system to establish with the home gateway device the individual communication session over the single communication tunnel, wherein establishing the individual communication session includes using the host system to assign an independent Internet address to the at least one of the multiple home-networked client devices that requested to communicate with the host system; and
communicating between the host system and the at least one of the multiple home-networked client devices through the home gateway device over the individual communication session, wherein the independent Internet address is mapped to a local address.

35. The method of claim 34 further comprising physically locating the home gateway device in a personal residence such that the request is received in the personal residence.

36. The method of claim 35 wherein the personal residence is a single family dwelling such that the request is received in the single family dwelling.

37. The method of claim 34 further comprising physically locating the home gateway device and the multiple home-networked client devices in a personal residence such that the request is received in the personal residence.

38. The method of claim 37 wherein the personal residence is a single family dwelling such that the request is received in the single family dwelling.

39. The method of claim 34 further comprising:
using the host system to establish multiple simultaneous individual communication sessions with the home gateway device over the single communication tunnel, wherein establishing the multiple simultaneous individual communication sessions includes assigning an independent Internet address to each of the multiple home-networked client devices that requests to communicate with the host system; and
communicating between the host system and the multiple home-networked client devices through the home gateway device over the multiple simultaneous individual communication sessions, wherein each independent Internet address is mapped to a local address assigned to each of the multiple home-networked client devices.

40. The method as in claim 39 further comprising having the host system use the assigned independent Internet address to communicate individual information maintained by the host system to the multiple home-networked client devices.

41. The method as in claim 40 wherein the individual information includes host-based parental controls.

42. The method as in claim 40 wherein the individual information includes wallet information.

43. The method as in claim 40 wherein the individual information includes calendar information.

44. The method as in claim 40 wherein the individual information includes personalized web page information.

45. The method of claim 34 wherein the host system includes an Internet Service Provider.

* * * * *